United States Patent
Ishihara

(10) Patent No.: US 6,690,497 B2
(45) Date of Patent: Feb. 10, 2004

(54) OPTICAL SCANNER AND IMAGE FORMING APPARATUS USING THE SAME

(75) Inventor: Keiichiro Ishihara, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/271,750

(22) Filed: Oct. 17, 2002

(65) Prior Publication Data

US 2003/0063359 A1 Apr. 3, 2003

Related U.S. Application Data

(62) Division of application No. 09/826,910, filed on Apr. 6, 2001, now Pat. No. 6,556,332.

(30) Foreign Application Priority Data

Apr. 13, 2000 (JP) ........................................ 2000-111985

(51) Int. Cl.⁷ ............................................... G02B 26/08
(52) U.S. Cl. ....................... 359/207; 359/205; 359/216; 359/204; 347/244; 347/258; 347/259
(58) Field of Search ................................ 359/204–207, 359/216–219, 662; 347/233, 244, 258–259

(56) References Cited

U.S. PATENT DOCUMENTS

| 5,488,502 A | * | 1/1996 | Saito ........................... 359/205 |
| 5,557,446 A | * | 9/1996 | Kato ........................... 359/206 |
| 5,715,079 A | | 2/1998 | Ono |
| 5,995,131 A | | 11/1999 | Fujibayashi et al. |
| 6,075,638 A | | 6/2000 | Masuda ....................... 359/206 |
| 6,256,132 B1 | | 7/2001 | Ishibe |
| 6,512,623 B1 | * | 1/2003 | Ishihara ....................... 359/205 |
| 2002/0048072 A1 | | 4/2002 | Ishihara ....................... 359/204 |

FOREIGN PATENT DOCUMENTS

| JP | 4-60608 | 2/1992 |
| JP | 9-265041 | 10/1997 |
| JP | 10-023246 | 1/1998 |

* cited by examiner

Primary Examiner—James Phan
(74) Attorney, Agent, or Firm—Fitzpatrick, Cella, Harper & Scinto

(57) ABSTRACT

A light scanner in which, when forming an image on a scan surface by a scanning optical device through a deflector using light from a light source device, the scanning optical device includes first an second fθ lenses. The first fθ lens is a meniscus positive lens whose concave surface faces the deflector within a main scanning cross-sectional plane. The second fθ lens is a meniscus lens whose convex surface faces the deflector within the main scanning cross-sectional plane. The shape of the second fθ lens is such that the curvature from the optical axis thereof to both ends of a lens effective portion changes from convex to concave. The second fθ lens is such that it is disposed closer to the deflector at both ends of the lens effective portion than at an apex thereof on the optical axis of the second fθ lens. The invention provides a light scanner which porperly corrects curvature of field and distortion in a main scanning direction and curvature of field and magnification in a subscanning direction, and which is suitable for high-definition print using a compact structure.

25 Claims, 22 Drawing Sheets

OPTICAL SCANNER AND IMAGE FORMING APPARATUS USING THE SAME

CROSS-REFERENCE TO RELATED APPLICATION

This is a divisional application of U.S. patent application Ser. No. 09/826,910, filed Apr. 6, 2001, U.S. Pat. No. 6,556,332.

BACKGROUND OF THE INVENTION

1. Field of the Invention

The present invention relates to an optical scanner and an image forming apparatus using the optical scanner. More particularly, the present invention relates to an optical scanner which is suitable for use in an apparatus, such as a laser beam printer or a digital copying machine, making use of an electrophotographic process, and which is used to record image information by deflecting (reflecting) light which has exited from a light source means using a polygon mirror serving as a light deflector, and by scanning a scan surface with the light through a scanning optical means (that is, an fθ lens system). Even more particularly, the present invention relates to an optical scanner which makes it possible to always provide a proper image by correcting the curvature of field and the fθ characteristic in a main scanning direction as a result of forming a plurality of fθ lenses which make up the scanning optical means with proper shapes.

2. Description of the Related Art

Hitherto, in a light scanner of, for example, a laser beam printer, light from a light source means which has been modulated in accordance with an image signal is periodically deflected by a deflecting means, such as a rotating polygon mirror. Then, the deflected light is focused in the form of a spot on the surface of a photosensitive recording medium (that is, a photosensitive drum) by a scanning optical means having an fθ characteristic in order to scan the surface of the recording medium with the light, whereby an image is recorded.

FIG. 22 is a schematic view of the main portion of a conventional light scanner. In FIG. 22, divergent light beams which have exited from a light source means 91 are converted into substantially parallel light beams by a collimator lens 92. These substantially parallel light beams travel to a diaphragm 93 which limits the amount of light incident upon a cylindrical lens 94 having a refractive power only in a subscanning direction. Of the substantially parallel light beams incident upon the cylindrical lens 94, those within a main scanning cross-sectional plane exit from the cylindrical lens 94 as substantially parallel light beams, while those within the subscanning cross-sectional plane are focused in order to form an image which is a substantially linear image on a deflecting surface 95a of a deflecting means 95, which is a rotating polygon mirror.

The light beams which have been deflected (reflected) at the deflecting surface 95a of the deflecting means 95 are led to a photosensitive drum surface 98 serving as a scan surface through a scanning optical means 99 having an fθ characteristic. By rotating the deflecting means 95 in the direction of arrow A, the photosensitive drum surface 98 is scanned with the light beams in order to record image information.

In order to record image information with high precision using this type of light scanner, it is important that the diameter of the spot be the same by properly correcting the curvature of field throughout the entire scan surface, and that the scanning speed on the scan surface be kept the same (fθ characteristic). Conventionally, various light scanners and fθ lens systems (that is, scanning optical means) which satisfy such optical characteristics have been proposed. Since laser beam printers, digital copying machines, and the like are becoming more compact and lower in cost, there has been a demand for making light scanners more compact and lower in cost.

A light scanner which is both more compact and lower in cost is disclosed in, for example, Japanese Patent Laid-Open No. 10-23246. According to this document, curvature of field and distortion are properly corrected, and the influences of, for example, changes in spot diameters due to image heights are made small.

In general, in order to make a light scanner more compact, it is necessary to decrease the focal length of the fθ system, to increase the angle of view, and to bring fθ lenses of the fθ lens system closer to the polygon mirror serving as a deflecting means. All of these make it difficult to correct aberrations, resulting in the problem that the curvature of field and the fθ characteristic in a wide angle-of-view area are not properly corrected when the light scanner is made more compact by the aforementioned ways.

When the angle of view is increased, another problem arises. In conventional light scanners, light which has exited from the light source means is incident upon a deflecting surface of the polygon mirror obliquely from the optical axis of the fθ lens system. The location where the light is deflected (reflected) at the deflecting surface changes continuously and asymmetrically with respect to the center of scanning. This asymmetrical change in the location of deflection influences the location of image formation, making it difficult to obtain a flat curvature of field.

In the first place, the asymmetrical change in the location of reflection occurs because light from the light source means is incident upon the polygon mirror obliquely from the optical axis of the fθ lens system. Therefore, the asymmetrical change can be eliminated by causing the light from the light source means to be incident upon the polygon mirror from the direction of the optical axis of the fθ lens system. However, this is not possible because of the lens arrangement. Since the light must be made incident upon the polygon mirror from outside the fθ lens system, it is impossible to eliminate the asymmetry of the curvature of field caused by asymmetrical changes in the location of reflection.

Examples that make the upper and lower portions of the generating-line shapes of the fθ lenses asymmetrical are proposed in, for example, Japanese Patent Laid-Open Nos. 4-60608 and 9-265041.

In order to make the fθ lens system more compact, it is necessary to properly correct the curvature of field and the fθ characteristic even in an area having a wide angle of view of ±47 degrees. Therefore, past proposals have not necessarily made it possible to satisfactorily correct the curvature of field and the fθ characteristic.

In order to make the light scanner capable of using multiple beams, it is necessary to convert the light beams which have exited from the collimator lens into substantially parallel light beams to decrease jitters in the main scanning direction.

SUMMARY OF THE INVENTION

Accordingly, it is an object of the present invention to provide an optical scanner which can properly correct curvature of field and distortion in a main scanning direction and curvature of field and changes in magnification in a subscanning direction by forming a plurality of fθ lenses of a scanning optical means with proper shapes, and which is suitable for high-definition printing using a compact structure. It is also an object of the present invention to provide an image forming apparatus using the same.

To these ends, according to a first aspect of the present invention, there is provided a light scanner comprising light-incident optical means that guides light which has exited from light source means to deflecting means, and scanning optical means for forming an image on a scan surface using the light reflected and deflected by the deflecting means. In the light scanner, the scanning optical means comprises at least a first lens and a second lens. The first lens is a meniscus positive lens whose concave surface faces the deflecting means within a main scanning cross-sectional plane, and the second lens is a meniscus lens whose convex surface faces the deflecting means within the main scanning cross-sectional plane. The shape of a light-incident surface of the second lens within the main scanning cross-sectional plane is such that the curvature changes from convex to concave from the optical axis of the second lens to either end of an effective portion of the second lens. Portions of a surface of the second lens at either end of the effective portion are disposed closer to the deflecting means than a portion of the surface of the second lens at an apex thereof on the optical axis of the second lens.

In one form of the first aspect, the first and second lenses are both aspherical lenses, with a light-incident surface and a light-exiting surface of the first lens being displaced towards the scan surface with respect to a base spherical surface, and the light-incident surface and a light-exiting surface of the second lens being displaced towards the deflecting means with respect to a base spherical surface.

In another form of the first aspect, the shapes of a light-incident surface and a light-exiting surface of the first lens and the shape of a light-exiting surface of the second lens within the main scanning cross-sectional plane are such that either end of each surface of the first lens and either end of the surface of the second lens are disposed closer to the deflecting means than each surface of the first lens at an apex of the first lens on the optical axis thereof and the surface of the second lens at an apex of the second lens on the optical axis thereof, respectively. In addition, the curvatures at either end of the light-incident surface and the light-exiting surface of the first lens and the curvatures of the light-incident surface and the light-exiting surface of the second lens are negative.

In still another form of the first aspect, a light-incident surface and a light-exiting surface of the first lens have curvatures that increase from the optical axis of the first lens to either end of the first lens.

In still another form of the first aspect, when the refractive powers of the first and second lenses within the main scanning sectional plane are φ1 and φ2, respectively, the following condition is satisfied:

$\phi 2 \leq \phi 1/5$.

In still another form of the first aspect, the principal plane of the second lens is disposed closer to the deflecting means than the principal plane of the first lens.

In still another form of the first aspect, when the distance from a deflecting surface of the deflecting means to a surface of the second lens disposed on the side of the scan surface is d, and the effective scanning width on the scan surface is W, the following condition is satisfied:

$d/W \leq 0.2$.

In still another form of the first aspect, when the fθ coefficient of the scanning optical means is k, and the effective scanning width on the scan surface is W, the following condition is satisfied:

$k/W \leq 0.6$.

In still another form of the first aspect, the light source means comprises a plurality of light-emitting sections.

According to a second aspect of the present invention, there is provided an image forming apparatus comprising any one of the above-described forms of the light scanners of the first aspect, and a printer controller for converting code data input from an external device into an image signal, and inputting the image signal to the light scanner.

According to a third aspect of the present invention, there is provided a light scanner comprising light-incident optical means for guiding light which has exited from light source means to deflecting means, and scanning optical means for forming an image on a scan surface using the light deflected by the deflecting means. In the light scanner, the light-incident optical means causes the light which has exited from the light source means to be incident upon a deflecting surface of the deflecting means obliquely from the optical axis of at least one of a plurality of lenses comprising the scanning optical means, the optical axis being within a main scanning cross-sectional plane. At least one of the plurality of lenses has at least one aspherical surface whose shape changes asymmetrically on either side of the optical axis of the at least one lens in a main scanning direction. The at least one aspherical surface of the at least one lens is a tilted generating-line asymmetrical surface wherein a light-source-means end of the surface is closer to the scan surface than the other end of the surface disposed away from the light source means with respect to the optical axis of the at least one lens.

In one form of the third aspect, the tilted generating-line asymmetrical surface is formed on a lens of the plurality of lenses of the scanning optical means disposed closest to the scan surface.

In another form of the third aspect, the light scanner is a multiple-beam light scanner, and the tilted generating-line asymmetrical surface is formed on one or both surfaces of the at least one of the plurality of lenses of the scanning optical means.

In still another form of the third aspect, the at least one aspherical surface of the at least one of the plurality of lenses is a generating-line asymmetrical curvature surface such that the surface has at the light-source-means end a curvature greater than the curvature at the other end of the lens effective portion disposed away from the light source means with respect to the optical axis of the at least one lens.

When the at least one aspherical surface of the at least one of the plurality of lenses is a generating-line asymmetrical curvature surface such that the surface has at the light-source-means end a curvature greater than the curvature at the other end of the lens effective portion disposed away from the light source means with respect to the optical axis of the at least one lens, the generating-line asymmetrical curvature surface may be formed on a lens of the plurality of lenses of the scanning optical means disposed closest to the scan surface.

When the at least one aspherical surface of the at least one of the plurality of lenses is a generating-line asymmetrical curvature surface such that the surface has at the light-source-means end a curvature greater than the curvature at the other end of the surface disposed away from the light source means with respect to the optical axis of the at least one lens, the generating-line asymmetrical curvature surface may be formed on one or both surfaces of the at least one of the plurality of lenses of the scanning optical means.

According to still another form of the third aspect, the scanning optical means comprises first and second lenses, and, when the refractive powers of the first and second lenses within the main scanning cross-sectional plane are φ1 and φ2, respectively, the following condition is satisfied:

$$\phi2 \leq \phi1/5.$$

According to still another form of the third aspect, the principal plane of the second lens is disposed closer to the deflecting means than the first lens.

According to still another form of the third aspect, when the distance from the deflecting surface of the deflecting means to a surface of the second lens disposed at the side of the scan surface is d, and the effective scanning width on the scan surface is W, the following condition is satisfied:

$$d/W \leq 0.2.$$

According to still another form of the third aspect, the light-source-means side of an effective portion of each of first and second lenses is longer than the side of the effective portion of each of the first and second lenses disposed away from the light source means with respect to the optical axis of each of the first and second lenses.

According to still another form of the third aspect, when the fθ coefficient of the scanning optical means is k, and the effective scanning width on the scan surface is W, the following condition is satisfied:

$$k/W \leq 0.6.$$

According to still another form of the third aspect, the light-incident optical means comprises a condenser lens for converting the light which has exited from the light source means into either substantially parallel light beams or weakly focused light beams, and, when the distance from the deflecting surface of the deflecting means to a point where the light beams are naturally focused by the condenser lens is L, and the fθ coefficient of the scanning optical means is k, the following condition is satisfied:

$$|L| \geq 3 \times k.$$

According to still another aspect of the third aspect, the light source means comprises a plurality of light-emitting sections.

According to a fourth aspect of the present invention, there is provided an image forming apparatus comprising any one of the above-described the light scanners of the third aspect, and a printer controller for converting code data input from an external device into an image signal, and inputting the image signal to the light scanner.

According to a fifth aspect of the present invention, there is provided a light scanner comprising light-incident optical means for guiding light which has exited from light source means to deflecting means, and scanning optical means for forming an image on a scan surface using the light reflected and deflected by the deflecting means. In the light scanner, the light-incident optical means causes the light which has exited from the light source means to be incident upon a deflecting surface of the deflecting means obliquely from the optical axis of the scanning optical means within a main scanning cross-sectional plane. The scanning optical means comprises at least a plurality of lenses, with at least one of the plurality of lenses being within the main scanning cross-sectional plane and having at least one aspherical surface whose shape changes asymmetrically on either side of the optical axis of the at least one lens in a main scanning direction. The at least one aspherical surface of the at least one of the plurality of lenses is a generating-line asymmetrical curvature surface such that the surface has at a light-source-means end a curvature greater than at the other end of the surface disposed away from the light source means with respect to the optical axis of the at least one lens.

In one form of the fifth aspect, the generating-line asymmetrical curvature surface is formed on the lens of the plurality of lenses of the scanning optical means disposed closest to the scan surface.

In another form of the fifth aspect, the generating-line asymmetrical curvature surface is formed on one or both surfaces of the at least one of the plurality of lenses of the scanning optical means.

In still another form of the fifth aspect, the scanning optical means comprises first and second lenses, and, when the refractive powers of the first and second lenses within the main scanning cross-sectional plane are φ1 and φ2, respectively, the following condition is satisfied:

$$\phi2 \leq \phi1/5.$$

In still another form of the fifth aspect, the principal plane of the second lens is disposed closer to the deflecting means than the first lens.

In still another form of the fifth aspect, when the distance from the deflecting surface of the deflecting means to a surface of the second lens disposed at the side of the scan surface is d, and the effective scanning width on the scan surface is W, the following condition is satisfied:

$$d/W \leq 0.2.$$

In still another form of the fifth aspect, the light-source-means side of an effective portion of each of first and second lenses is longer than the side of the effective portion of each of the first and second lenses disposed away from the light source means with respect to the optical axis of each of the first and second lenses.

In still another form of the fifth aspect, when the fθ coefficient of the scanning optical means is k, and the effective scanning width on the scan surface is W, the following condition is satisfied:

$$k/W \leq 0.6.$$

In still another form of the fifth aspect, the light-incident optical means comprises a condenser lens for converting the light which has exited from the light source means into either substantially parallel light beams or weakly focused light beams, and, when the distance from the deflecting surface of the deflecting means to a point where the light beams are naturally focused by the condenser lens is L, and the fθ coefficient of the scanning optical means is k, the following condition is satisfied:

$$|L| \geq 3 \times k.$$

In still another form of the fifth aspect, the light source means comprises a plurality of light-emitting sections.

According to a sixth aspect of the present invention, there is provided an image forming apparatus comprising any one of the forms of the light scanners of the fifth aspect, and a printer controller for converting code data input from an external device into an image signal, and inputting the image signal to the light scanner.

Further objects, features and advantages of the present invention will become apparent from the following description of the preferred embodiments with reference to the attached drawings.

DESCRIPTION OF THE PREFERRED EMBODIMENTS

First Embodiment

Figure 1:
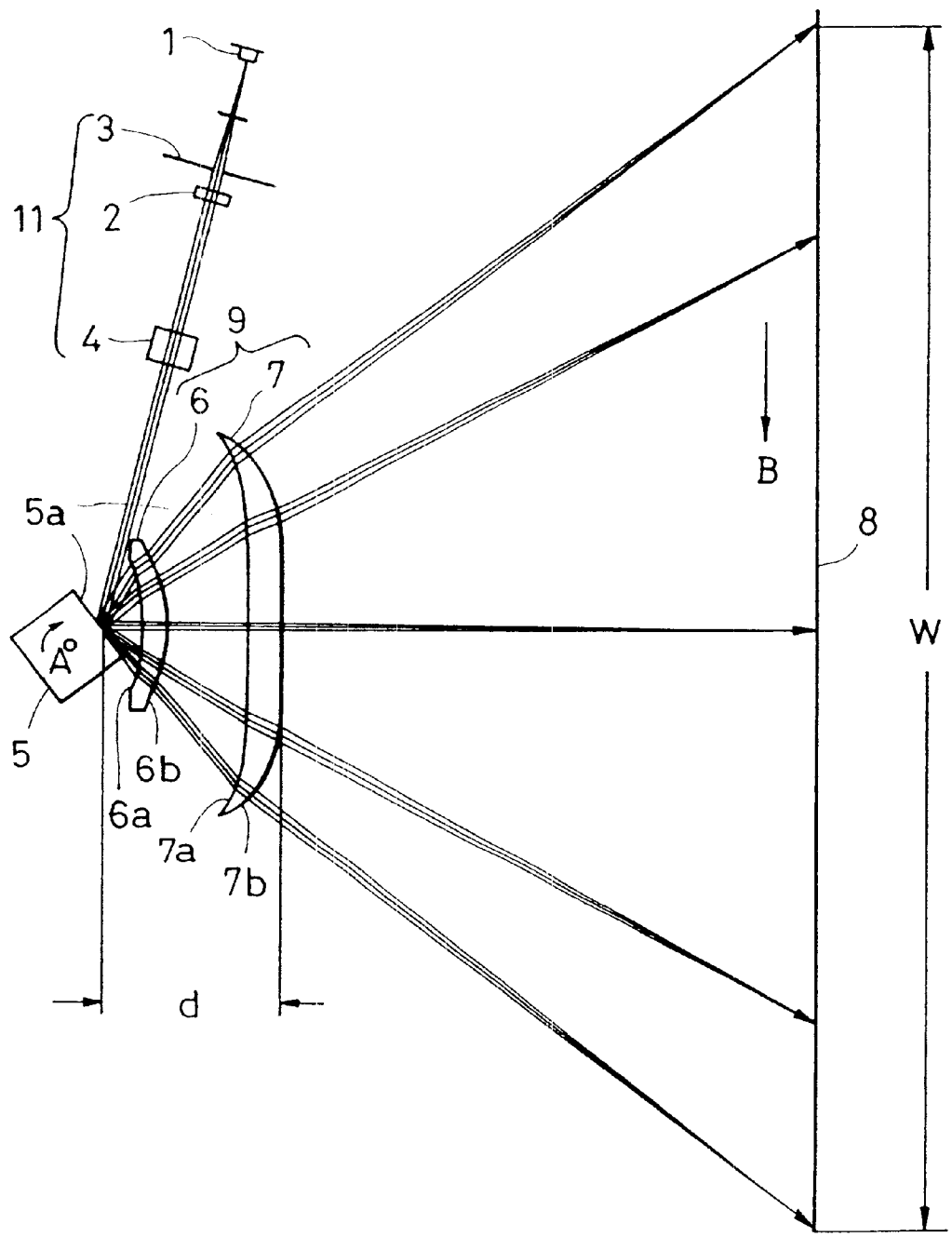
FIG. 1 is a sectional view of the main portion of a first embodiment of an optical scanner in accordance with the present invention in a main scanning direction thereof.

FIG. 1 is a sectional view of the main portion of a first embodiment of an optical scanner in accordance with the present invention in a main scanning direction thereof.

In the specification, the direction in which a deflecting means deflects (reflects) light for performing a scanning operation is defined as the main scanning direction (which corresponds to the direction of a generating line), while a direction which is perpendicular to the main scanning direction and the optical axis of a scanning optical means is defined as the subscanning direction (which corresponds to the direction perpendicular to the direction of the generating line).

Referring to FIG. 1, reference numeral 1 denotes a light source means, which is, for example, a semiconductor laser. Reference numeral 3 denotes a diaphragm for controlling the diameter of a light beam which is being transmitted. Reference numeral 2 denotes a collimator lens which serves as a condenser lens for converting the light beam which exits from the light source means 1 into substantially parallel light beam portions. Reference numeral 4 denotes a cylindrical lens (that is, an anamorphic lens) which has a predetermined amount of refractive power only in the subscanning direction, and which forms, using the substantially parallel light beam portions from the collimator lens 2, an image which is a substantially linear image near a deflecting surface (that is, a reflecting surface) 5a of a light deflector 5 (described later) within a subscanning cross-sectional plane. The diaphragm 3, the collimator lens 2, and the cylindrical lens 4 are each a component part of a light-incident optical means 11.

The light deflector 5 serving as a deflecting means is a rotating polygon mirror having, for example, four surfaces, and rotates with a constant speed in the direction of arrow A (shown in FIG. 1) by a driving means (not shown) such as a motor.

Reference numeral 9 denotes a scanning optical means (that is, an fθ lens system) having an fθ characteristic. The scanning optical means 9 comprises two lenses, a first fθ lens 6 and a second fθ lens 7, having shapes described later. In addition, the scanning optical means 9 has a tilt correcting function. The tilt is corrected by forming an image on a photosensitive drum surface 8 (that is, a scan surface) using the light beam portions which are based on image information obtained when the light beams have been deflected (reflected) by the light deflector 5, and by putting the scan surface 8 and the deflecting surface 5a of the light deflector 5 in a conjugate relationship within the subscanning cross-sectional plane.

In the embodiment, the light-which has exited from the semiconductor laser 1 is limited in amount by the diaphragm 3. Then, the light beam from the diaphragm 3 is converted into substantially parallel light beams by the collimator lens 2. These substantially parallel light beams are incident upon the cylindrical lens 4. Of the substantially parallel light beams which have impinged upon the cylindrical lens 4, those within a main scanning cross-sectional plane exit therefrom unchanged. On the other hand, those within the subscanning cross-sectional plane are focused to form an image which is substantially a linear image (that is, a substantially longitudinal linear image in the main scanning direction) at the deflecting surface 5a of the light deflector 5. The light beam portions which have been deflected (reflected) at the deflecting surface 5a of the light detector 5 are focused in the form of a spot on the photosensitive drum surface 8 through the first and second fθ lenses 6 and 7. By rotating the light deflector 5 in the direction of arrow A, the photosensitive drum surface 8 is optically scanned at a constant speed in the direction of arrow B (that is, the main scanning direction), whereby an image recording operation is performed on the photosensitive drum surface 8 serving as a recording medium.

A description of the characteristics of the first and second fθ lenses 6 and 7 which make up the scanning optical means 9 used in the embodiment will now be given.

In the embodiment, the scanning optical system 9 is made up of the first and second fθ lenses 6 and 7 having positive refractive powers. By forming these fθ lenses 6 and 7 so that the refractive powers are properly shared by them, a proper curvature of field characteristic is obtained.

More specifically, in the embodiment, when the refractive powers of the first and second fθ lenses 6 and 7 are φ1 and φ2, respectively, within the main scanning cross-sectional plane, the following Formula (1) is satisfied:

$$\phi 2 \leq \phi 1/5 \tag{1}$$

The second fθ lens 7 comprises a meniscus positive lens whose convex surface faces the polygon mirror 5 within the main scanning cross-sectional plane. Its principal plane is positioned closer to the polygon mirror 5 than the first fθ lens 6. By virtue of this structure, the curvature of field characteristic and the fθ characteristic are both properly corrected. Here, the term "shape" refers to the shape of the spherical surface of a base of the second lens 7 near the optical axis.

The first and second fθ lenses 6 and 7 are aspherical lenses having both surfaces formed with generating-line shapes (that is, main scanning cross-sectional shapes) which are not arcuate. By forming these lenses fθ lenses 6 and 7 with proper asphericity distribution, a proper curvature-of-field characteristic and a proper fθ characteristic are obtained.

Figure 2:
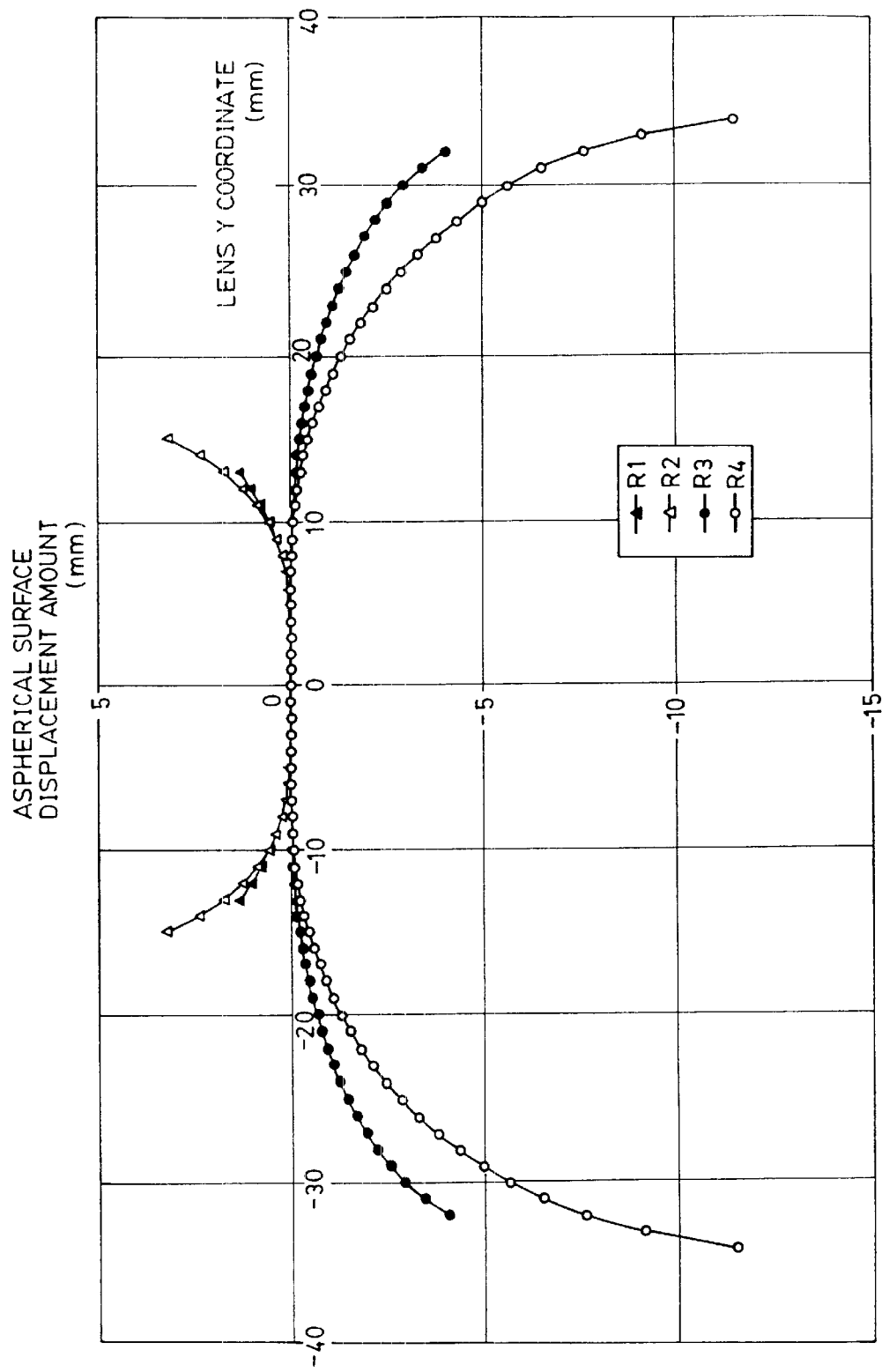
FIG. 2 is a graph showing the amount of displacement of each aspherical surface of each fθ lens used in the first embodiment of the present invention.

FIG. 2 is a graph illustrating the displacements of both surfaces 6a and 6b of the first fθ lens 6 and both surfaces 7a and 7b of the second fθ lens 7. In FIG. 2, R1, R2, R3, and R4 represent the surfaces 6a and 6b of the first fθ lens 6 and the surfaces 7a and 7b of the second fθ lens 7, respectively, in that order. With regard to the coordinates of the surfaces 6a and 6b of the first fθ lens 6 and the surfaces 7a and 7b of the second fθ lens 7, when the surfaces 6a, 6b, 7a, and 7b are at the + side, they displaced towards the scan surface 8 side, whereas when they are at the − side, they are displaced towards the polygon mirror 5 side.

The first fθ lens 6 is a meniscus positive lens whose concave surface faces the polygon mirror 5 within the main scanning cross-sectional plane. The light-incident surface 6a and the light-exiting surface 6b are both formed with asphericities which cause them to be displaced towards the scan surface 8 from the base spherical surfaces (near the optical axis), so that the curvature-of-field characteristic is primarily properly corrected.

In this way, in the embodiment, by properly varying each of the surfaces 6a and 6b of the first fθ lens 6 and each of the surfaces 7a and 7b of the second fθ lens 7, the degrees of freedom thereof can be increased.

In general, in order to make the optical scanner more compact, a scanning optical means (that is, an fθ lens system) which satisfies the required curvature and the fθ characteristic even in a wide angle-of-view area is demanded.

In the embodiment, each of the lenses is formed so that the following Formula (2) is satisfied:

$$k/W \leq 0.6 \tag{2}$$

where k is the fθ coefficient of the scanning optical means 9, and W is the effective scanning width on the scan surface 8.

Figure 3:
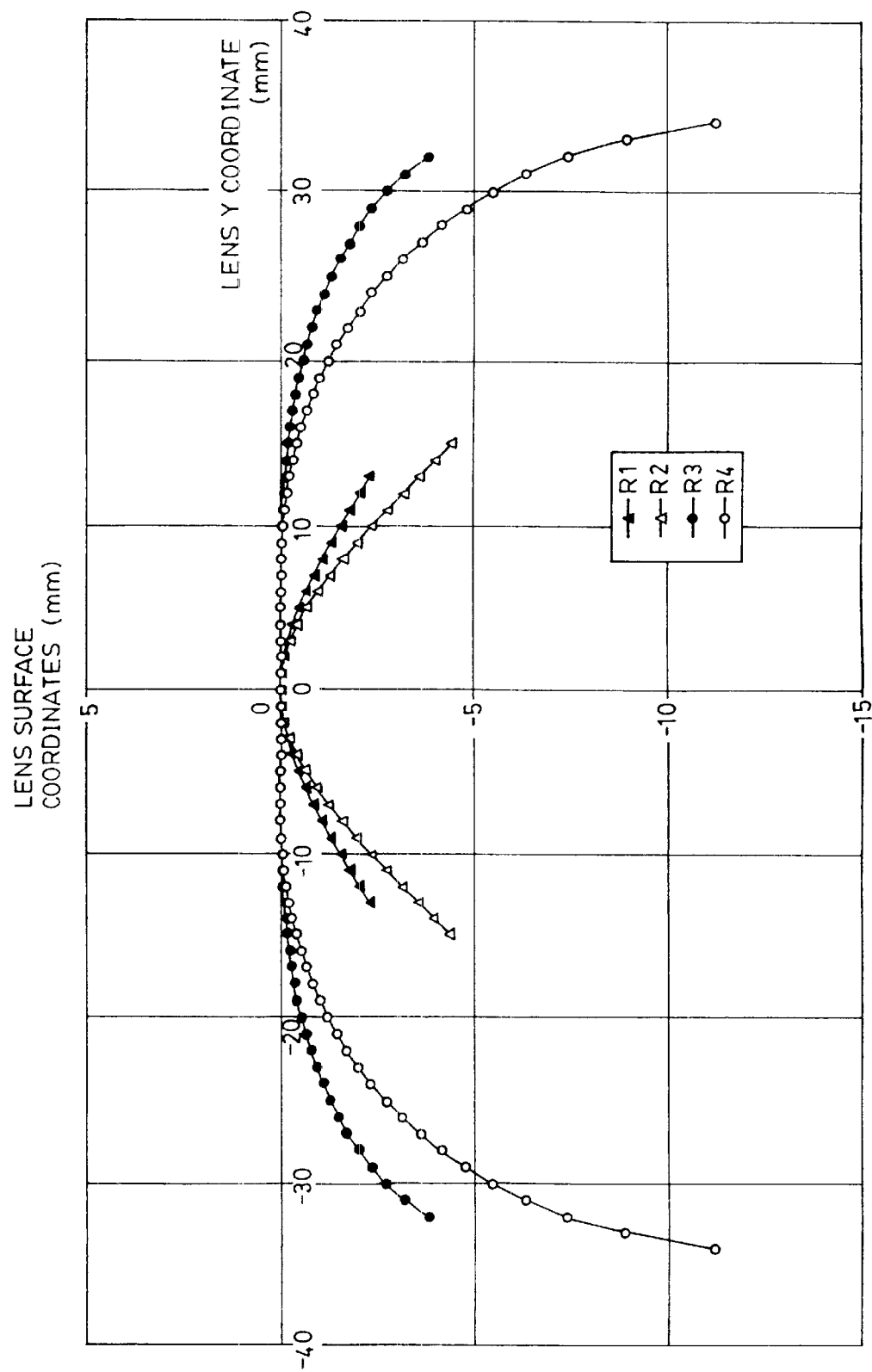
FIG. 3 is a graph showing the coordinates of each surface of each fθ lens used in the first embodiment of the present invention.

More specifically, in the embodiment, the scanning optical means 9 is constructed so that the effective scanning width w is equal to 214 mm, the fθ coefficient k is equal to 110 mm/rad, and the wide angle of view is equal to ±55.7 degrees so as to satisfy Formula (2). The coordinates of each of the surfaces 6a and 6b of the first fθ lens 6 and each of the surfaces 7a and 7b of the second fθ lens 7 are shown in FIG. 3. With regard to the coordinates of the lens surfaces 6a and 6b, and 7a and 7b, the point where each of the lens surfaces 6a, 6b, 7a, and 7b intersect is defined as the origin. The generating-line shapes of the lens surfaces are represented using a relative coordinate system of each of the lens surfaces 6a, 6b, 7a, and 7b.

The fθ coefficient k (mm/rad) establishes the following relationship when the angle of view is θ (rad) and the image height on the scan surface 8 is Y(mm):

$$Y = k \times \theta.$$

When the light beam portions incident upon the deflecting means in the main scanning direction are parallel light beam portions, the fθ coefficient becomes equal to the focal length of the scanning optical means 9.

In the figure, R1, R2, R3, and R4 represent the surfaces 6a and 6b of the first fθ lens 6 and the surfaces 7a and 7b of the second fθ lens 7, respectively, in that order. With regard to the coordinates of the surfaces 6a and 6b of the first fθ lens 6 and the surfaces 7a and 7b of the second fθ lens 7, when the surfaces 6a, 6b, 7a, and 7b are at the + side, they are at the scan surface side, whereas, when they are at the − side, they are at the polygon mirror 5 side.

With regard to the generating-line shape of the light-incident surface 7a of the second fθ lens 7, the convex portion of the base spherical surface on the optical axis of the lens 7 faces the polygon mirror 5, and the displacement of the aspherical surface 7a from the optical axis to both ends of an effective portion of the lens 7 is such as to become gradually larger towards the polygon mirror 5 from the base spherical surface of the lens 7, so that the curvature changes from convex to concave. This causes the surface at both ends of the effective portion of the lens 7 to be positioned closer to the polygon mirror 5 than the surface at the vertex of the lens 7 on the optical axis thereof. Therefore, even with a wide angle of view of ±55.7 degrees, it is possible to properly correct the fθ characteristic.

Figure 4:
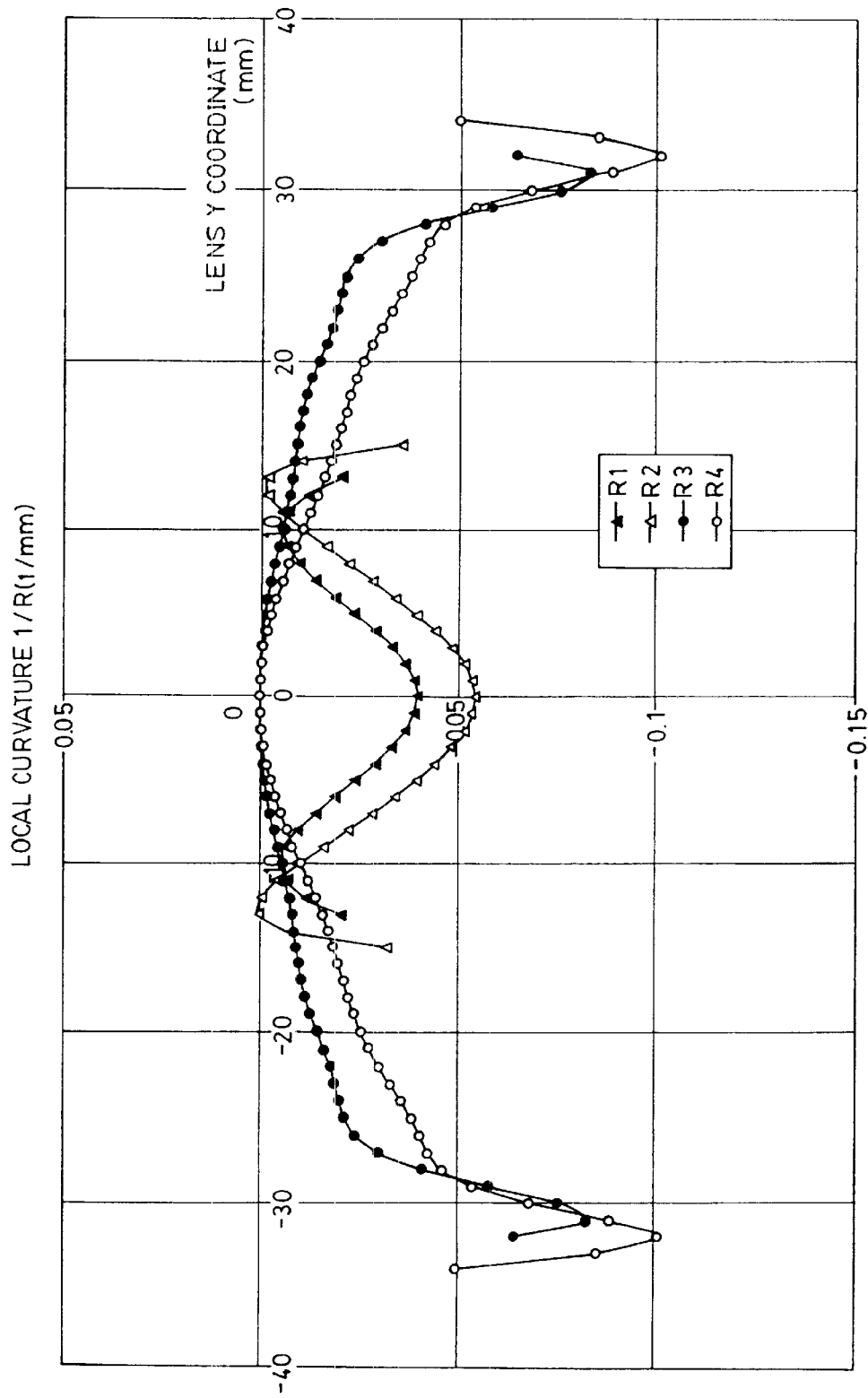
FIG. 4 is a graph showing the curvature of each surface of each fθ lens used in the first embodiment of the present invention.

FIG. 4 is a graph illustrating the curvature (local curvature 1/R) of each of the surfaces 6a and 6b of the first fθ lens 6 and each of the surfaces 7a and 7b of the second fθ lens 7.

The curvature of each of the surfaces 6a and 6b of the first fθ lens 6 in the direction of the generating line (that is, the main scanning direction) is such as to become gradually greater from the optical axis of the lens 6 to both ends of an effective portion of the lens 6, and then to become gradually smaller from the point of inflection. This makes it possible to properly correct the curvature of field in a wide angle-of-view area.

With regard to the generating-line shape of each of the surfaces 6a and 6b of the first fθ lens 6 and each of the surfaces 7a and 7b of the second fθ lens 7 within the main scanning cross-sectional plane, each of the surfaces 6a, 6b, 7a, and 7b at both ends of the effective portion of each of the lenses 6 and 7 are disposed closer to the polygon mirror 5 than each of the surfaces 6a, 6b, 7a, and 7b at the apex of each of the lenses 6 and 7 on the optical axis, and the curvatures at both ends of the effective portion of each of the lenses 6 and 7 are negative. This forms the lenses 6 and 7 into a concentric lens system, making it possible to properly correct wave aberration even in a wide angle-of-view area.

In the embodiment, each of the first and second fθ lenses 6 and 7 is constructed with a generating-line aspherical shape which can be represented by a hexadecimal function. For example, when the point of intersection of the first fθ lens 6, the second fθ lens 7, and the optical axis is defined as the origin, and the direction of the optical axis is defined as the X axis, while the axis which is perpendicular to the optical axis within the main scanning cross sectional plane is defined as the Y axis, the generating-line direction which corresponds to the main scanning direction is represented by the following Formula (3):

$$X = \frac{Y^2/R}{1+\sqrt{(1-(1+K)(Y/R)^2)}} + B_4 Y^4 + \quad (3)$$

-continued
$$B_6 Y^6 + B_8 Y^8 + B_{10} Y^{10} + B_{12} Y^{12} + B_{14} Y^{14} + B_{16} Y^{16}$$

where R is the generating-line curvature radius, and K, $B_4$, $B_6$, $B_8$, $B_{10}$, $B_{12}$, $B_{14}$, and $B_{16}$ each represent an aspherical coefficient.

In the embodiment, the optical axis of the scanning optical means 9 is disposed so as to be superimposed on the optical axis which extends towards the center of the effective scanning width of the scan surface 8. This prevents the first and second fθ lenses 6 and 7 from being shifted and tilted.

In the embodiment, when the distance from the deflecting surface 5a of the polygon mirror 5 to the surface 7b of the second fθ lens 7 at the scan surface 8 side is d, and the effective scanning width on the scan surface 8 is W, each component part is formed so that Formula (4) is satisfied:

$$d/w \leq 0.2 \quad (4)$$

In the embodiment, d/w=0.15. By disposing the scanning optical means 9 near the polygon mirror 5, the whole optical scanner is made more compact.

Figure 5:
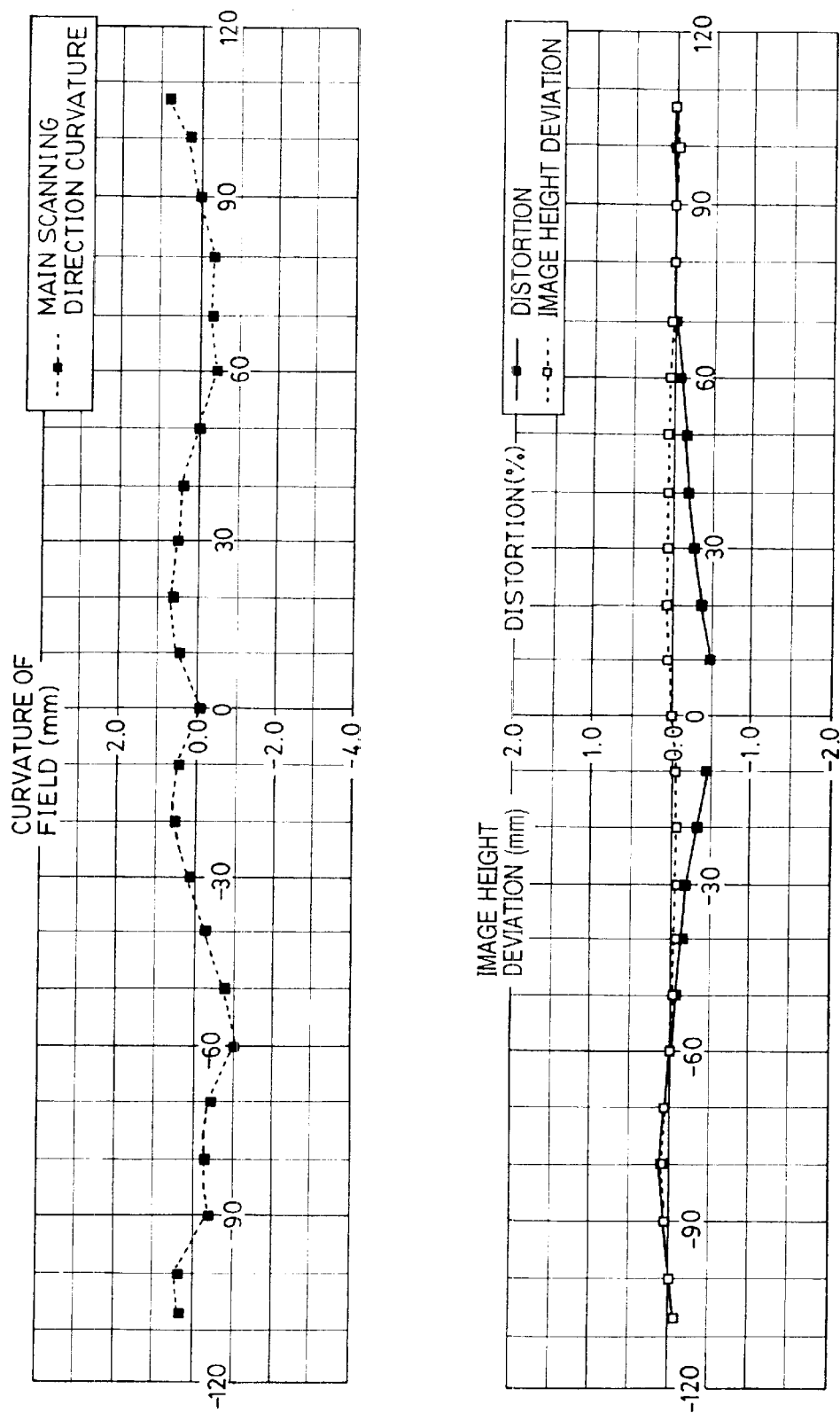
FIG. 5 shows graphs illustrating the curvature of field and the distortion in the first embodiment of the present invention.

Table 1 gives various coefficients for representing the generating-line shapes of the first and second fθ lenses 6 and 7 and various other characteristics thereof. FIG. 5 shows graphs showing the curvature of field and the distortion (fθ characteristic) in the embodiment. From FIG. 5, it can be seen that each of these aberrations is corrected by an amount where no practical problems arise.

TABLE 1

STRUCTURE OF LIGHT SCANNER

| fθ COEFFICIENT | | | | GENERATING-LINE SHAPE OF fθ LENS 6 | | | GENERATING-LINE SHAPE OF fθ LENS 7 | |
|---|---|---|---|---|---|---|---|---|
| | | | | FIRST SURFACE LIGHT SOURCE SIDE | SECOND SURFACE LIGHT SOURCE SIDE | | FIRST SURFACE LIGHT SOURCE SIDE | SECOND SURFACE LIGHT SOURCE SIDE |
| fθ COEFFICIENT | k | 110 | | | | | | |
| WAVELENGTH, REFRACTIVE INDEX | | | | | | | | |
| WAVELENGTH IN USE | λ(nm) | 780 | R | −2.53164E+01 | −1.86236E+01 | R | 1.96802E+03 | 1.96672E+03 |
| REFRACTIVE INDEX OF fθ LENS 6 | N1 | 1.5242 | K | −7.64493E−02 | −1.46165E−02 | K | −2.59316E+05 | 9.87381+02 |
| REFRACTIVE INDEX OF fθ LENS 7 | N2 | 1.5242 | B4 | 6.35295E−05 | 5.44523E−05 | B4 | −1.47852E−06 | −9.91117E−06 |
| ARRANGEMENT OF IMAGE-FORMING OPTICAL SYSTEM | | | B6 | −1.06685E−07 | 3.57786E−08 | B6 | −3.16147E−08 | 5.69092E−10 |
| REFLECTING SURFACE 5a OF POLYGON MIRROR to LIGHT-INCIDENT SURFACE 6a OF LENS 6 | d1 | 7.57 | B8 | 0.00000E+00 | 0.00000E+00 | B8 | 1.55266E−10 | 1.83773E−11 |
| LIGHT-INCIDENT SURFACE 6a OF LENS 6 to LIGHT-EXITING SURFACE 6b OF LENS 6 | d2 | 4.42 | B10 | 0.00000E+00 | 0.00000E+00 | B10 | −365875E−13 | −1.98809E−14 |
| LIGHT-EXITING SURFACE 6b OF LENS 6 to LIGHT-INCIDENT SURFACE 7a OF LENS 7 | d3 | 14.56 | B12 | 0.00000E+00 | 0.00000E+00 | B12 | 4.58865E−16 | −2.19307E−17 |
| LIGHT-INCIDENT SURFACE 7a OF LENS 7 to LIGHT-EXITING SURFACE 7b OF LENS 7 | d4 | 6.12 | B14 | 0.00000E+00 | 0.00000E+00 | B14 | −2.93352E−19 | 4.66147E−20 |
| LIGHT-EXITING SURFACE 7b OF LENS 7 to SCAN SURFACE 8 | d5 | 97.33 | B16 | 0.00000E+00 | 0.00000E+00 | B16 | 7.45714E−23 | −2.10721E−23 |
| | | | | SIDE AWAY FROM LIGHT SOURCE | SIDE AWAY FROM LIGHT SOURCE | | SIDE AWAY FROM LIGHT SOURCE | SIDE AWAY FROM LIGHT SOURCE |
| EFFECTIVE SCANNING WIDTH | W | 214 | R | −2.53164E+01 | −1.86236E+01 | R | 1.96802E+03 | 1.96672E+03 |
| k/W | k/W | 0.51 | K | −7.64493E−02 | −1.46165E−02 | K | −2.59316E+05 | 9.87381E+02 |
| | | | B4 | 6.35295E−05 | 5.37854E−05 | B4 | −1.47852E−06 | −9.74580E−06 |

TABLE 1-continued

STRUCTURE OF LIGHT SCANNER

| | | | | | | | | |
|---|---|---|---|---|---|---|---|---|
| REFLECTING SURFACE 5a OF POLYGON MIRROR to LAST SURFACE 7b of LENS | d | 32.67 | B6 | −1.06685E−07 | 4.03984E−08 | B6 | −3.16147E−08 | 2.43500E−10 |
| d/W | d/W | 0.15 | B8 | 0.00000E+00 | 0.00000E+00 | B8 | 1.55266E−10 | 1.79579E−11 |
| | | | B10 | 0.00000E+00 | 0.00000E+00 | B10 | −3.65875E−13 | −1.65243E−14 |
| REFLECTING SURFACE 5a OF POLYGON MIRROR to NATURAL FOCUSING POINT | L | ∞ | B12 | 0.00000E+00 | 0.00000E+00 | B12 | 4.58865E−16 | −2.81482E−17 |
| L/k | L/k | ∞ | B14 | 0.00000E+00 | 0.00000E+00 | B14 | −2.93352E−19 | 5.14816E−20 |
| | | | B16 | 0.00000E+00 | 0.00000E+00 | B16 | 7.45714E−23 | −2.24786E−23 |

As described above, by constructing the scanning optical means 9 by two fθ lenses, the wall thickness of the center of each lens in the optical axis direction can be made small, so that the molding tact time for molding the two fθ lenses out of plastic can be made shorter, result in reduced costs. The second fθ lens 7 has a positive refractive power within the main scanning cross-sectional plane. However, even if it has a negative refractive power, the curvature of field characteristic can be properly corrected.

In the first embodiment, the light scanner is not limited to a single beam scanner, so that a multiple beam scanner may also be used.

Second Embodiment

Figure 6:
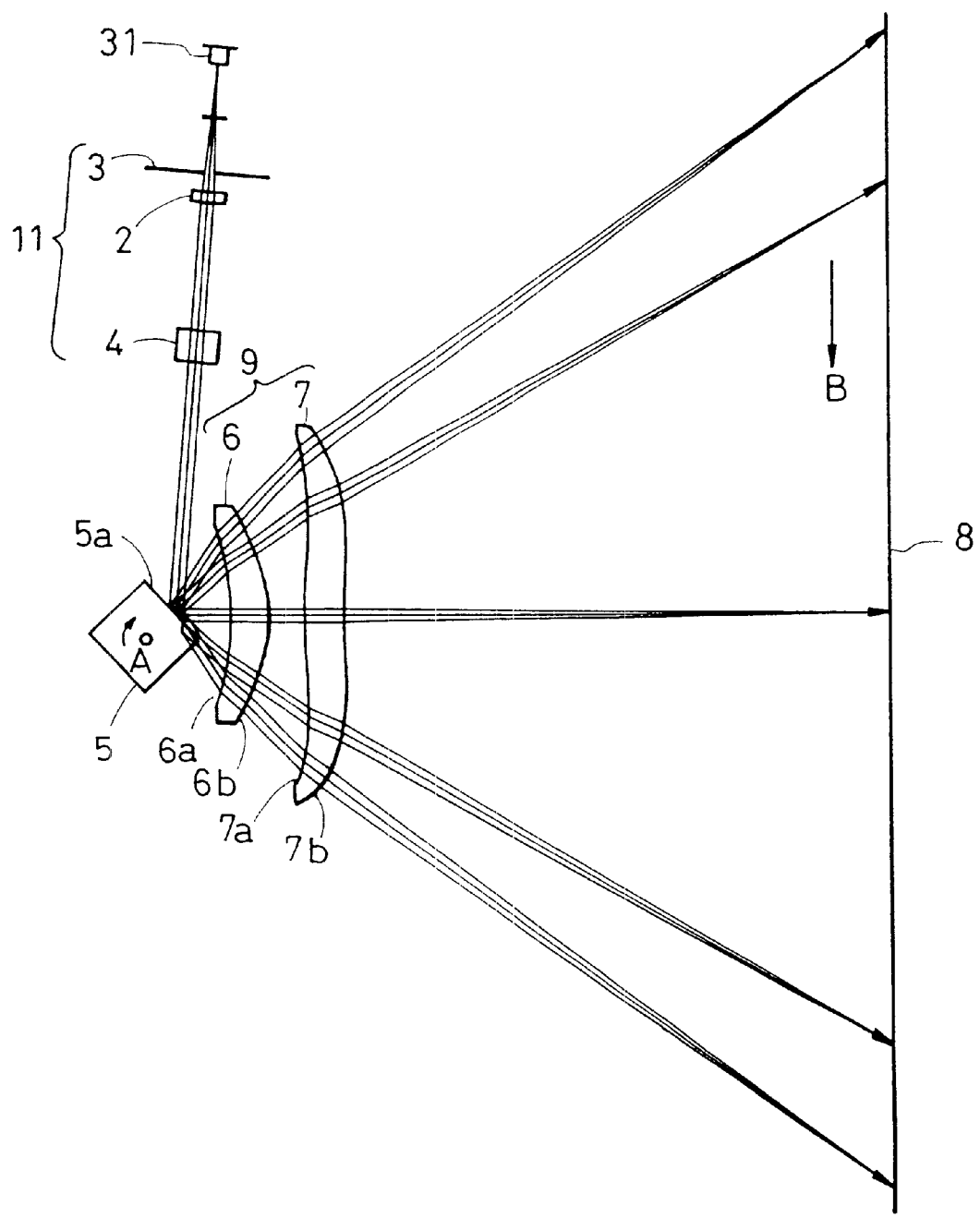
FIG. 6 is a sectional view of the main portion of a second embodiment of an optical scanner in accordance with the present invention in a main scanning direction thereof.

FIG. 6 is a sectional view of a second embodiment of a light scanner in accordance with the present invention in a main scanning direction. In FIG. 6, component parts which are essentially the same as those shown in FIG. 1 are given the same reference numerals.

The second embodiment differs from the first embodiment in the following three ways. First, a multiple-beam light scanner which scans a scan surface 8 using a plurality of light beams is used. Second, a plurality of light beams which have exited from a light source means 31 are incident upon a polygon mirror 5 obliquely from the optical axis of a scanning optical means 9 (that is, at an angle of 85 degrees from the optical axis of the scanning optical means 9) within a main scanning cross-sectional plane. Third, first and second fθ lenses 6 and 7 which make up the scanning optical means 9 are formed with shapes which are suitable for the polygon mirror 5 having four surfaces. The other structural features and optical operations are substantially the same as those in the first embodiment, so that similar advantages are provided.

Reference numeral 31 denotes a light source means, and comprises a multiple-semiconductor laser having a plurality of light-emitting sections.

In general, in a multiple-beam light scanner using a plurality of light beams, it is necessary to correct various aberrations even more properly. In particular, since curvature of field affects jitters between the plurality of beams, the correction of curvature of field is considered very important.

Figure 7:
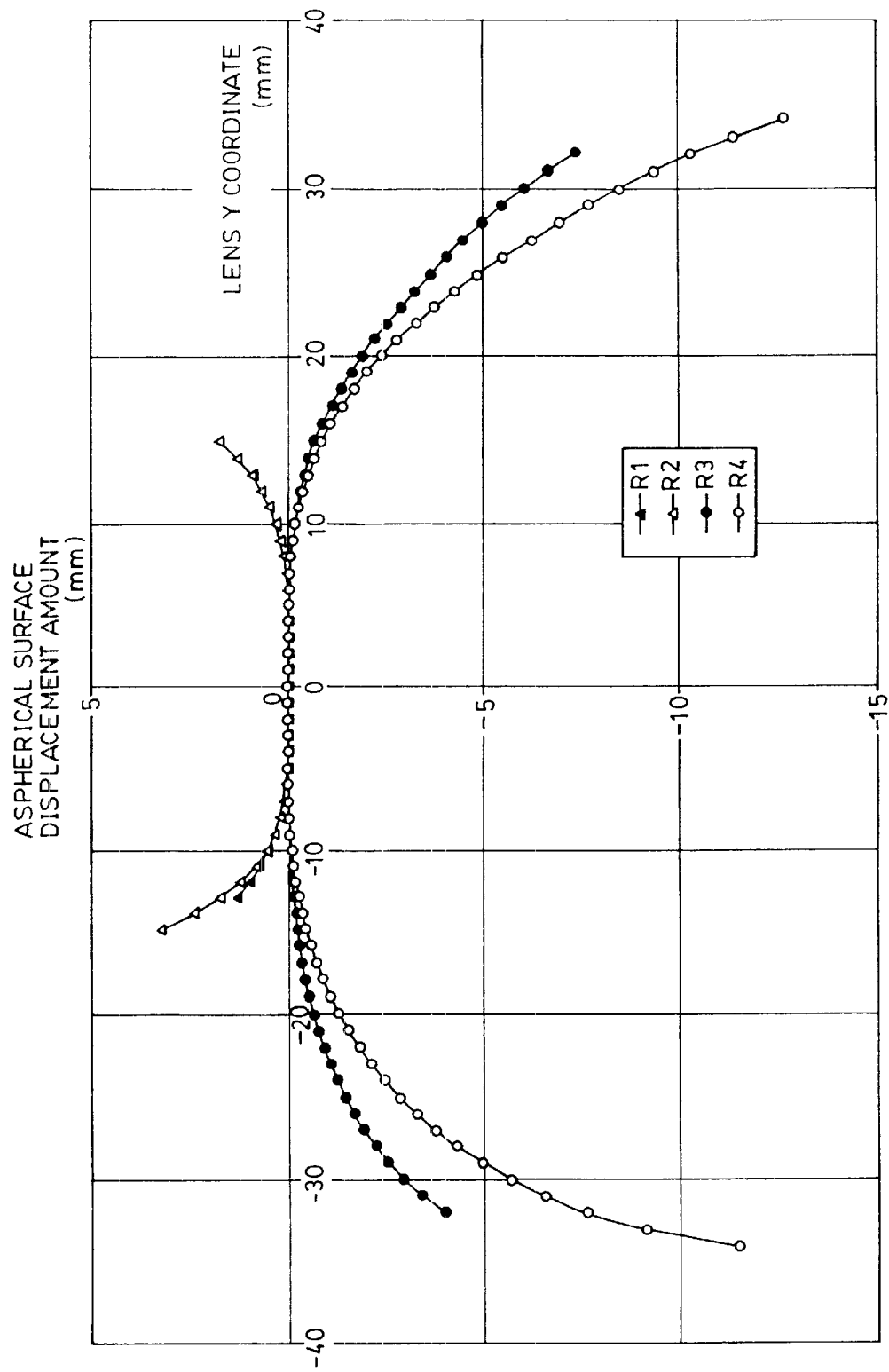
FIG. 7 is a graph showing the amount of displacement of each aspherical surface of each fθ lens used in the second embodiment of the present invention.
Figure 8:
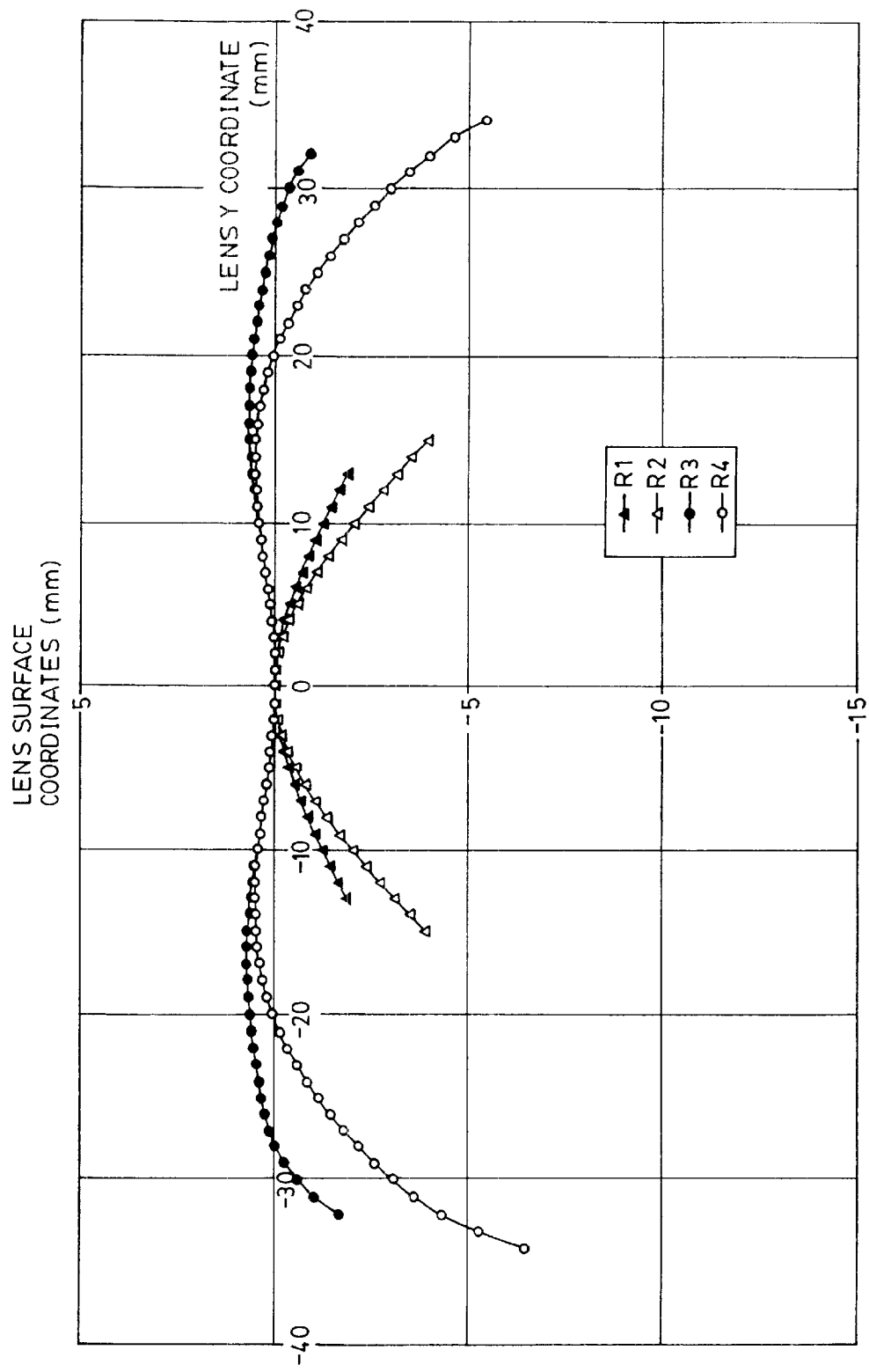
FIG. 8 is a graph showing the coordinates of each surface of each fθ lens used in the second embodiment of the present invention.
Figure 9:
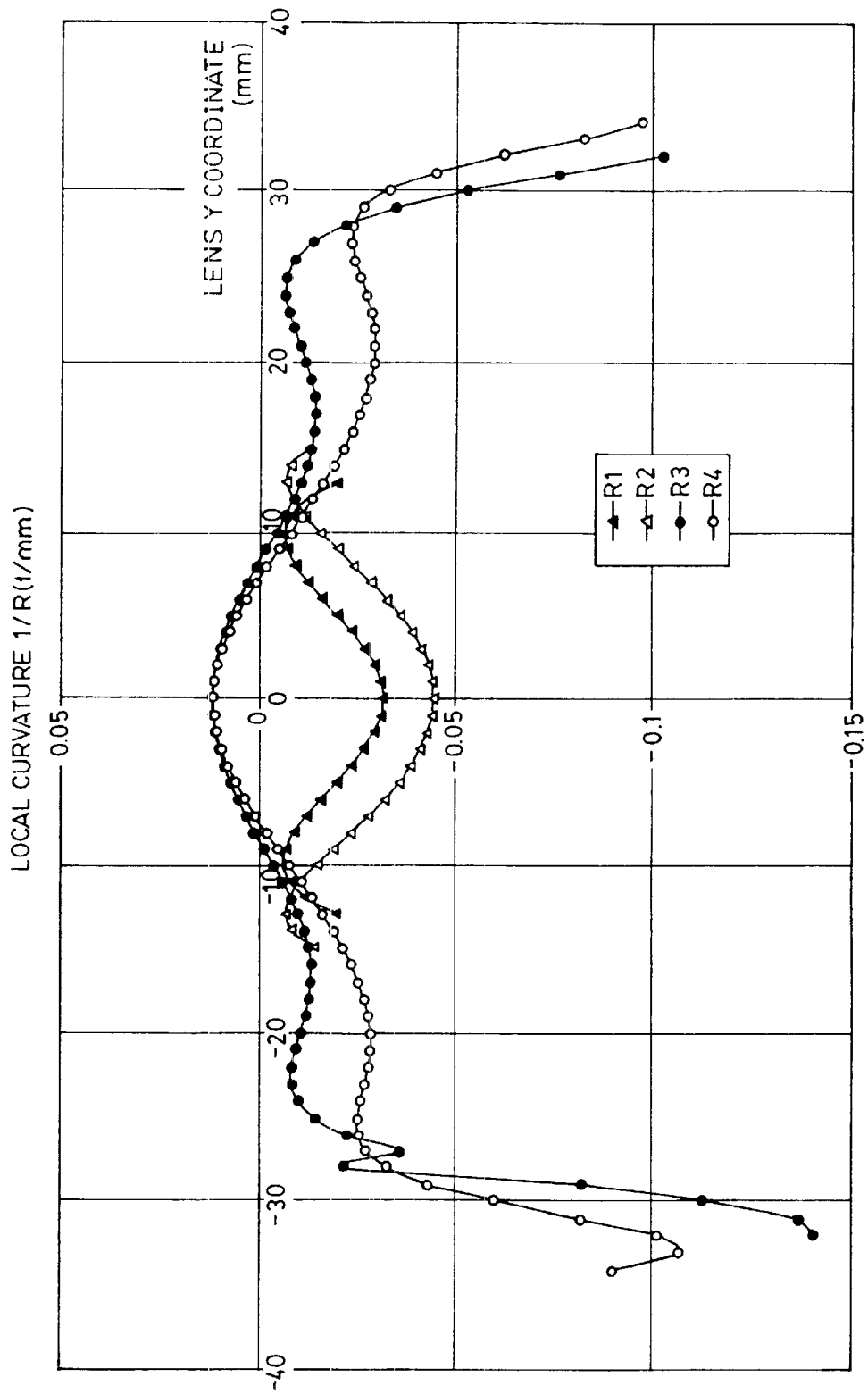
FIG. 9 is a graph showing the curvature of each surface of each fθ lens used in the second embodiment of the present invention.

FIG. 7 is a graph illustrating the amounts of displacement of surfaces 6a and 6b of the first fθ lens 6 and surfaces 7a and 7b of the second fθ lens 7. FIG. 8 is a graph illustrating the coordinates of each of the surfaces 6a and 6b of the first fθ lens 6 and each of the surfaces 7a and 7b of the second fθ lens 7. FIG. 9 is a graph illustrating the curvature of each of the surfaces 6a and 6b of the first fθ lens 6 and each of the surfaces 7a and 7b of the second fθ lens 7. The amounts of displacement, the coordinates, and the curvatures are substantially the same as those in the first embodiment, so that advantages similar to those which are provided by the first embodiment are provided.

The scanning optical means 9 which comprises the first and second fθ lenses 6 and 7 has three surfaces whose generating-line shapes are asymmetrical. These three surfaces correspond to the surface 6b of the first fθ lens 6 and both surfaces 7a and 7b of the second fθ lens 7.

The surfaces whose generating-line shapes are asymmetrical are hereinafter referred to as "generating-line asymmetrical surfaces." A generating-line asymmetrical surface is defined as a surface which varies its shape on both sides of the optical axis, that is, at the side of the optical means of each of the lenses 6 and 7 and at the side of each of the lenses 6 and 7 away from the optical means (in other words, at the upper and lower sides of each of the lenses 6 and 7 in the main scanning direction) due to different aspherical coefficients in the polynomial Formula (3) which expresses the generating-line shape of an asymmetrical surface.

Figure 10:
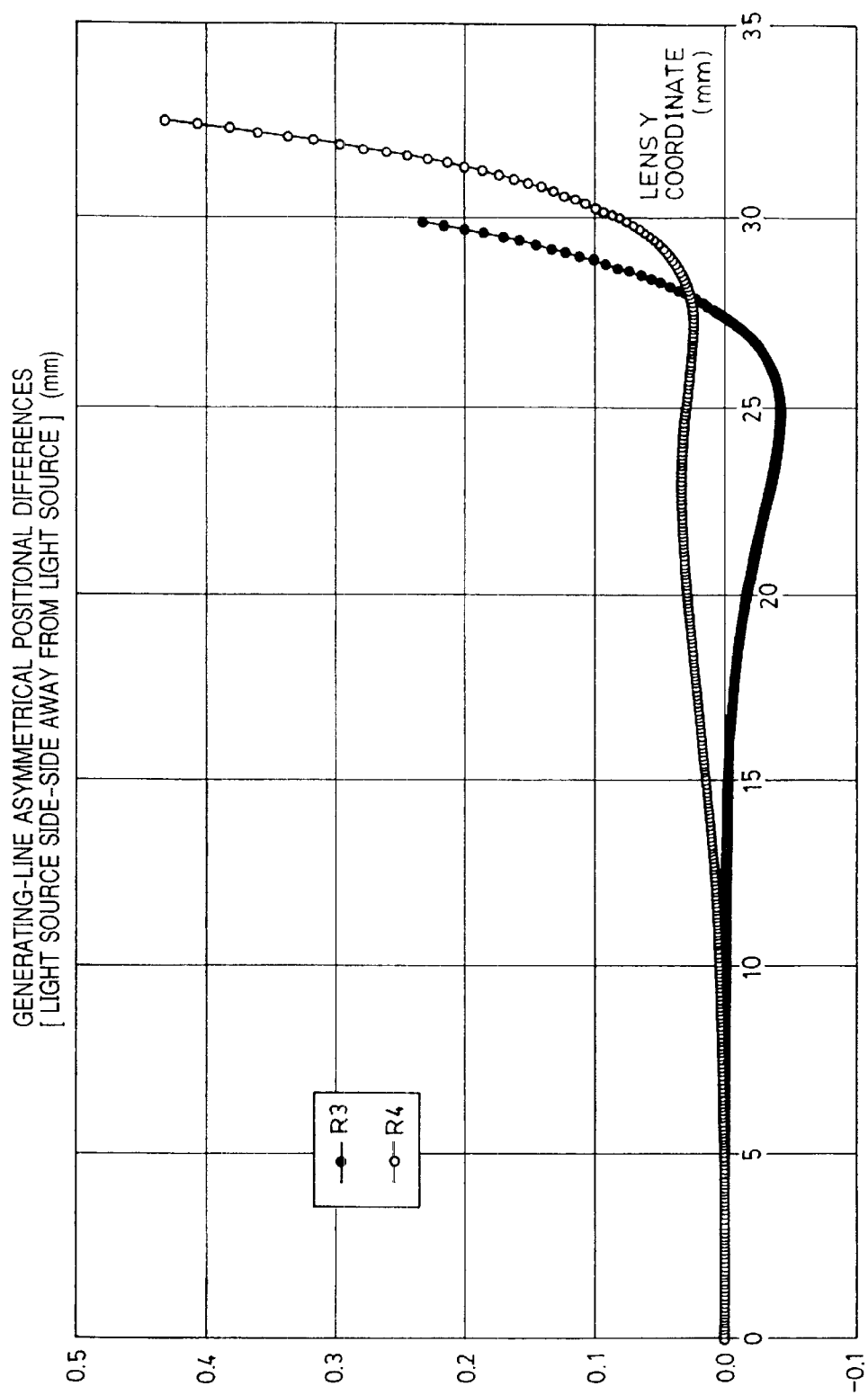
FIG. 10 is a graph showing the differences in position (that is, the asymmetry) of generating-line asymmetric surfaces in the second embodiment of the present invention.
Figure 11:
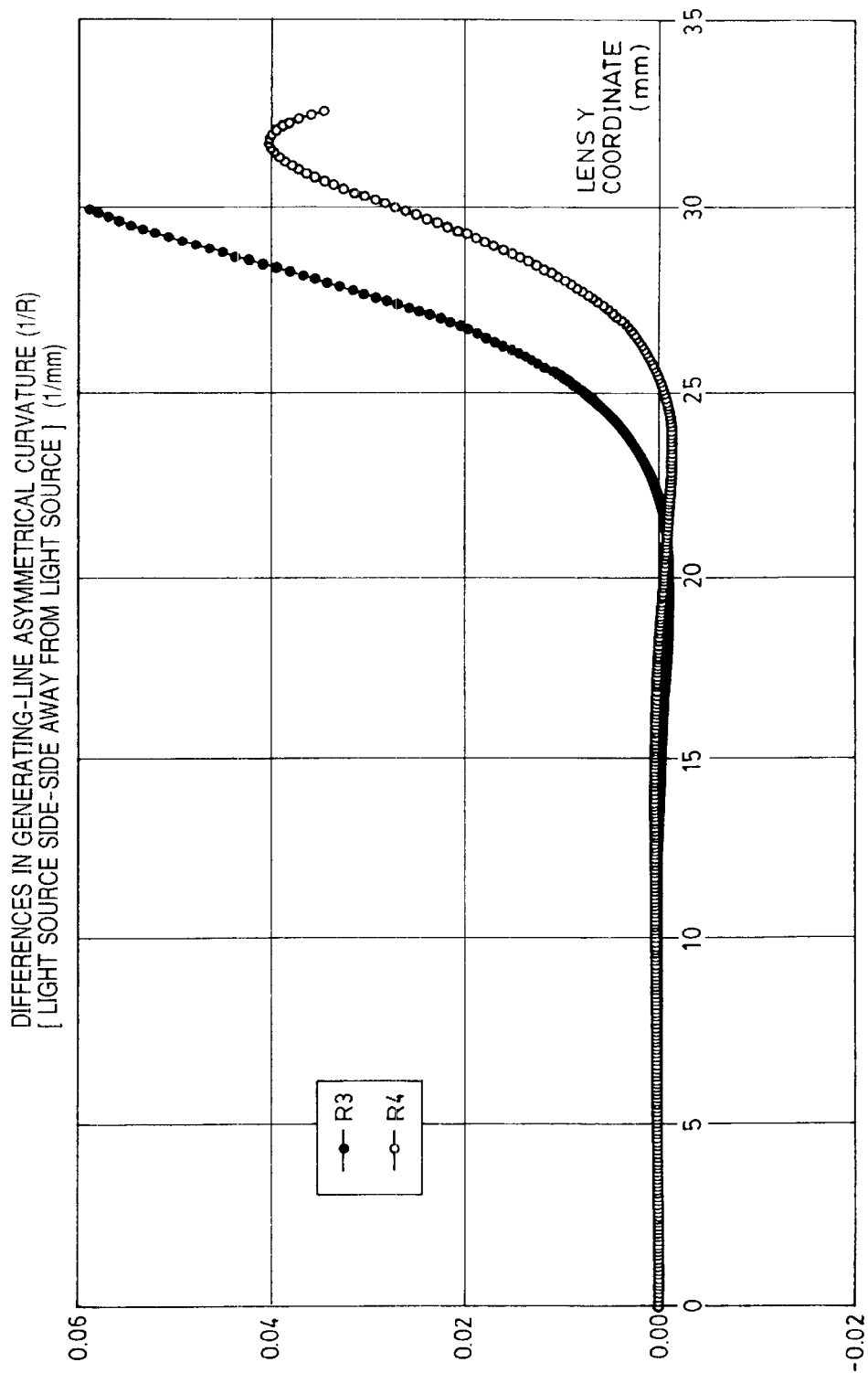
FIG. 11 is a graph showing the differences in curvature (1/R) (that is, the asymmetry) of the generating-line asymmetric surfaces in the second embodiment of the present invention.

FIGS. 10 and 11 are each graphs which illustrate the asymmetry of the generating-line shape of each of the surfaces 7a and 7b of the second fθ lens 7 used in the second embodiment.

FIG. 10 illustrates the differences in position between the light source means side (that is, the upper half) of the effective portion of each of the surfaces 7a and 7b of the lens 7 and the side of the effective portion of each of the surfaces 7a and 7b away from the light source means (that is, the lower half of the effective portion of each of the surfaces 7a and 7b) of the lens 7 in the direction of the optical axis (that is, the X direction), at equal distances from the optical axis in the main scanning direction (Y direction). Here, the optical axis is disposed between the light source means side and the side away from the light source. FIG. 10 is a plot of values obtained after subtracting the positional value of the light source means side of the effective portion of each of the surfaces 7a and 7b of the lens 7 from the corresponding positional value (that is, corresponding X coordinate) of the side of the effective portion of each of the surfaces 7a and 7b of the lens 7 away from the light source means, towards the optical axis. If the positional value is positive, the light source means side of each effective portion is disposed closer to the scan surface 8 than the side of each effective portion away from the light source means. On the other hand, if it is negative, it is disposed closer to the polygon mirror 5.

From FIG. 10, it can be seen that, with respect to the optical axis of the lens 7, the light-source-means end of the effective portion of each of the surfaces 7a and 7b is disposed closer to the scan surface 8 than the end of the effective portion of each of the surfaces 7a and 7b further from the light source means, so that the surfaces 7a and 7b of the lens 7 are tilted. Such generating-line asymmetrical surfaces are called tilted generating-line asymmetrical surfaces. In the embodiment, both surfaces 7a and 7b of the second fθ lens 7 are tilted generating-line asymmetrical surfaces.

FIG. 11 shows the differences in curvature (1/R) between the upper half of the effective portion and the lower half of the effective portion of each of the surfaces 7a and 7b of the lens 7, at equal distances from the optical axis in the main scanning direction, that is, when they are at corresponding Y coordinates. Here, the optical axis is disposed between the light source means side of each of the surfaces 7a and 7b and the side of each of the surfaces 7a and 7b away from the light source means. FIG. 11 is a plot of values obtained after subtracting the curvature (at a Y coordinate) of the side of the effective portion of each of the surfaces 7a and 7b of the lens 7 further from the light source means from the curvature (at the same Y coordinate) of the light-source-means side of the effective portion of each of the surfaces 7a and 7b of the lens 7. When the value is positive, the curvature of the light-source-means side of the effective portion of each of the surfaces 7a and 7b of the lens 7 is greater than the curvature of the side of the effective portion of each of the surfaces 7a and 7b of the lens 7 away from the light source means. On the other hand, if the value is negative, the curvature of the light source means side is less than the curvature of the side of the effective portion of each of the surfaces 7a and 7b of the lens 7 away from the light source means.

From FIG. 11, it can be seen that, for each of the surfaces 7a and 7b, the curvature of the end of the effective portion nearer the light source is greater than the end of the effective portion further from the light source. Such surfaces having different curvatures at both ends thereof are called generating-line asymmetrical curvature surfaces. In the second embodiment, both surfaces 7a and 7b of the second fθ lens 7 are generating-line asymmetrical curvature surfaces.

When the plurality of light beams which have exited from the light source means 31 are incident upon the polygon mirror 5 obliquely from the optical axis of the scanning optical means 9 (that is, at an angle of 85 degrees from the optical axis), the location where the light beams are deflected at a deflecting surface 5a of the polygon mirror 5 changes asymmetrically with respect to the optical axis of the scanning optical means 9.

As in the first embodiment, when the distance from the deflecting surface 5a of the polygon mirror 5 to the surface 7b of the second fθ lens 7 at the scan surface 8 side is d, and the effective scanning width on the scan surface 8 is W, the aforementioned Formula (4) becomes:

$$d/w = 0.15$$

In this way, when the scanning optical means 9 is disposed near the polygon mirror 5, by asymmetrically changing the location where the light beams are reflected as described above, even light beams which travel so that the angles of view of the upper and lower portions thereof are the same pass through asymmetrical locations on a lens surface. Therefore, asymmetrical changes in the location of reflection not only affects the location where an image is formed but also asymmetrically affects the fθ characteristic, resulting in a decrease in the optical performance.

To overcome this problem, in the second embodiment, the surfaces 7a and 7b of the second fθ lens 7 are formed as generating-line asymmetrical surfaces, that is, a generating-line asymmetrical tilted surface and a generating-line asymmetrical curvature surface in order to correct the adverse effects caused by asymmetrical changes in the location of reflection of light, whereby the curvature of field and the fθ characteristic are properly corrected.

Although, two generating-line asymmetrical surfaces (that is, a generating-line asymmetrical tilted surface and a generating-line asymmetrical curvature surface) are used in the second embodiment for the surfaces 7a and 7b of the second fθ lens 7, either one of these two types of surfaces may be used for the surfaces 7a and 7b.

Figure 12:
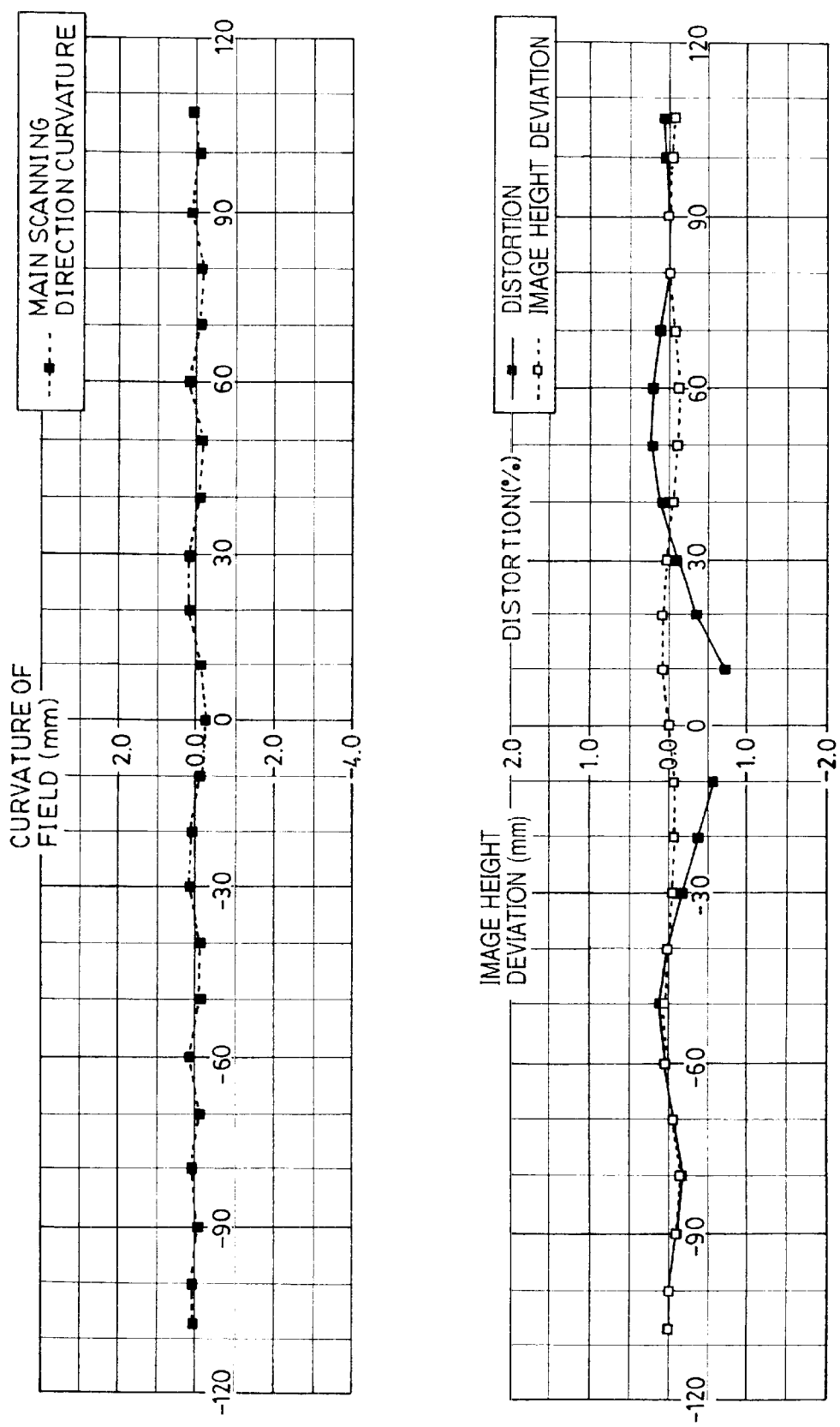
FIG. 12 shows graphs illustrating the curvature of field and the distortion in the second embodiment of the present invention.

Table 2 gives various coefficients for representing the generating-line shapes of the first and second fθ lenses 6 and 7 and various other characteristics thereof. FIG. 12 shows graphs showing the curvature of field and the distortion (fθ characteristic) in the second embodiment. From FIG. 12, it can be seen that each of these aberrations is corrected by an amount where no practical problems arise without tilting and shifting the first and second fθ lenses 6 and 7.

TABLE 2

STRUCTURE OF LIGHT SCANNER

| fθ COEFFICIENT | | | GENERATING-LINE SHAPE OF fθ LENS 6 | | | GENERATING-LINE SHAPE OF fθ LENS 7 | |
|---|---|---|---|---|---|---|---|
| | | | FIRST SURFACE LIGHT SOURCE SIDE | SECOND SURFACE LIGHT SOURCE SIDE | | FIRST SURFACE LIGHT SOURCE SIDE | SECOND SURFACE LIGHT SOURCE SIDE |
| fθ COEFFICIENT | k | 109 | | | | | |
| WAVELENGTH, REFRACTIVE INDEX | | | | | | | |
| WAVELENGTH IN USE | λ(nm) | 780 | R −3.20426E+01 | −2.25900E+01 | R | 8.18868E+01 | 8.42279E+01 |
| REFRACTIVE INDEX OF fθ LENS 6 | N1 | 1.5242 | K −2.52950E+00 | −1.20253E+00 | K | −6.70094E+00 | −1.44672E−01 |
| REFRACTIVE INDEX OF fθ LENS 7 | N2 | 1.5242 | B4 3.76525E−05 | 1.64827E−05 | B4 | −1.54751E−05 | −2.11477E−05 |
| ARRANGEMENT OF IMAGE-FORMING OPTICAL SYSTEM | | | B6 −8.74073E−08 | 3.57248E−08 | B6 | 1.40271E−08 | 2.39983E−08 |
| REFLECTING SURFACE 5a OF POLYGON MIRROR to LIGHT-INCIDENT SURFACE 6a OF LENS 6 | d1 | 10.50 | B8 0.00000E+00 | −1.17696E−10 | B8 | −1.60283E−12 | −2.65262E−11 |
| LIGHT-INCIDENT SURFACE 6a OF LENS 6 to LIGHT-EXITING SURFACE 6b OF LENS 6 | d2 | 7.05 | B10 0.00000E+00 | 0.00000E+00 | B10 | −2.86610E−15 | 2.12765E−14 |
| LIGHT-EXITING SURFACE 6b OF LENS 6 to LIGHT-INCIDENT SURFACE 7a OF LENS 7 | d3 | 6.44 | B12 0.00000E+00 | 0.00000E+00 | B12 | 0.00000E+00 | −7.51736E−18 |
| LIGHT-INCIDENT SURFACE 7a OF LENS 7 to LIGHT-EXITING SURFACE 7b OF LENS 7 | d4 | 7.54 | B14 0.00000E+00 | 0.00000E+00 | B14 | 0.00000E+00 | 0.00000E+00 |

TABLE 2-continued

STRUCTURE OF LIGHT SCANNER

| | | | | | | | | |
|---|---|---|---|---|---|---|---|---|
| LIGHT-EXITING SURFACE 7b OF LENS 7 to SCAN SURFACE 8 | d5 | 102.47 | B16 | 0.00000E+00 | 0.00000E+00 | B16 | 0.00000E+00 | 0.00000E+00 |
| | | | | SIDE AWAY FROM LIGHT SOURCE | SIDE AWAY FROM LIGHT SOURCE | | SIDE AWAY FROM LIGHT SOURCE | SIDE AWAY FROM LIGHT SOURCE |
| EFFECTIVE SCANNING WIDTH | W | 214 | R | −3.20426E+01 | −2.25900E+01 | R | 8.18868+E01 | 8.42279E+01 |
| k/W | k/W | 0.51 | K | −2.52950E+00 | −1.20253E+00 | K | −6.70094E+00 | −1.44672E−01 |
| | | | B4 | 3.76525E−05 | 1.75895E−05 | B4 | −1.52892E−05 | −2.16735E−05 |
| REFLECTING SURFACE 5a OF POLYGON MIRROR to LAST SURFACE 7b of LENS | d | 31.53 | B6 | −8.74073E−08 | 3.44511E−08 | B6 | 1.27012E−08 | 2.57921E−08 |
| d/W | d/W | 0.15 | B8 | 0.00000E+00 | −1.22554E−10 | B8 | 2.71130E−12 | −3.08953E−11 |
| | | | B10 | 0.00000E+00 | 0.00000E+00 | B10 | −6.69872E−15 | 2.78266E−14 |
| REFLECTING SURFACE 5a OF POLYGON MIRROR to NATURAL FOCUSING POINT | L | ∞ | B12 | 0.00000E+00 | 0.00000E+00 | B12 | 0.00000E+00 | 1.12132E−17 |
| L/k | L/k | ∞ | B14 | 0.00000E+00 | 0.00000E+00 | B14 | 0.00000E+00 | 0.00000E+00 |
| | | | B16 | 0.00000E+00 | 0.00000E+00 | B16 | 0.00000E+00 | 0.00000E+00 |

Figure 13:
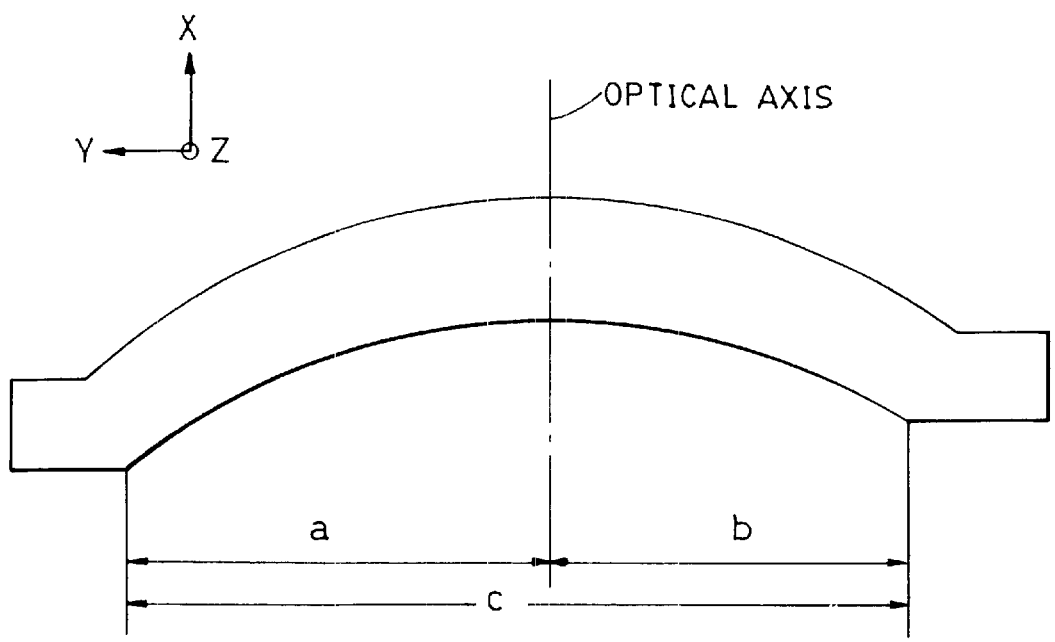
FIG. 13 is a graph showing the asymmetries of the upper and lower portion of an effective portion of each lens in the second embodiment of the present invention.

FIG. 13 is a sectional view of the main portion of the first and second fθ lenses in the main scanning direction. In FIG. 13, c denotes the effective portion of each of the first and second fθ lenses, with a denoting the light-source-means side of the effective portion of each of the first and second fθ lenses 6 and 7, and b denoting the side of the effective portion of each of the first and second fθ lenses 6 and 7 further from the light source means.

In the second embodiment, the location of each of the lenses 6 and 7 through which the light beam furthest from the optical axis passes is asymmetrical, so that the distances from the optical axis to the upper and lower half (that is, the light-source-means side and the side further from the light source means) of the effective portion of each of the lenses 6 and 7 are asymmetrical. Therefore, it is no longer necessary to increase the length of each of the fθ lenses more than is necessary, thereby making the whole optical scanner more compact and lower in cost. In particular, when, as regards the distances from the optical axis to both ends of the effective portion of each of the fθ lenses 6 and 7, the length of the light-source-means side of the effective portion of each lens is a, and the length of the side of the effective portion away from the light source means 1 of each of the fθ lenses 6 and 7 is b, $a > b.$ Although a multiple-beam light scanner is used in the second embodiment, a single-beam light scanner having a single light-emitting section may also be used.

Although the plurality of light beams from the light source means 31 are converted into substantially parallel light beams by the condenser lens, the light beams may also be converted into weakly focused light beams.

Third Embodiment

Figure 14A:
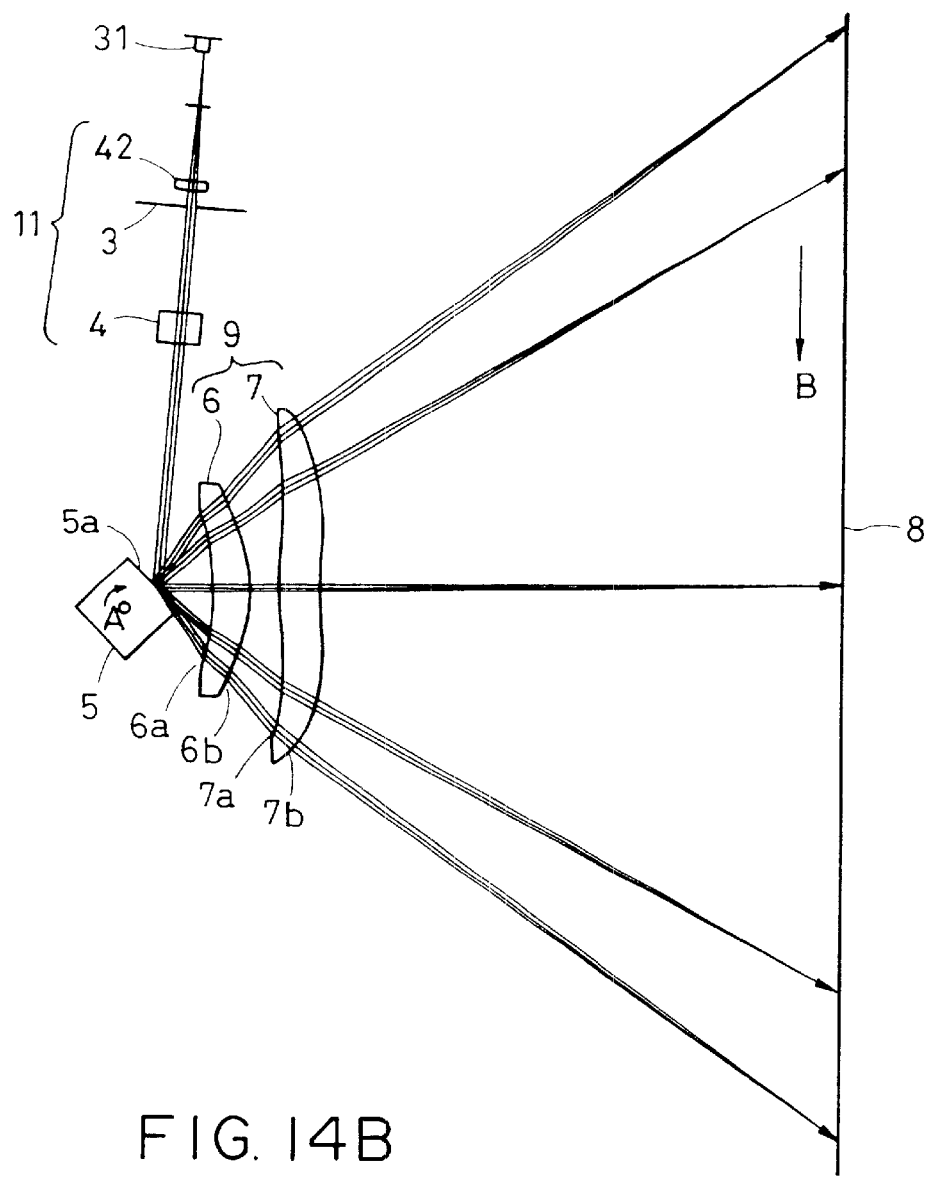
FIGS. 14A and 14B are sectional views of the main portion of a third embodiment of an optical scanner in accordance with the present invention in a main scanning direction and a subscanning direction, respectively.
Figure 14B:
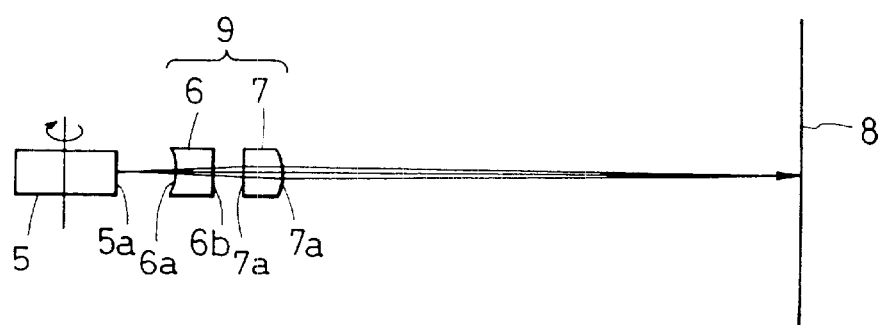

FIG. 14A is a sectional view of the main portion of a third embodiment of a light scanner in accordance with the present invention in a main scanning direction. FIG. 14B is a sectional view of the main portion thereof in a subscanning direction of FIG. 14A. In FIGS. 14A and 14B, component parts corresponding to those shown in FIG. 6 are given the same reference numerals.

The third embodiment differs from the second embodiment in the following two ways. First, a plurality of light beams from a light source means 1 are weakly focused by a condenser lens 42. Second, a scanning optical means 9 is formed with lenses having shapes which are optimal for a multiple-beam light scanner in order to correct aberrations in the subscanning direction. The other structural features and optical operations are substantially the same as those of the second embodiment, so that similar advantages are provided.

More specifically, in FIGS. 14A and 14B, the condenser lens 42 converts the plurality of light beams which have exited from the light source means 1 into weakly focused light beams, respectively.

As mentioned above, when a multiple-beam light scanner is used, not only is it necessary to correct the curvature of field and the fθ characteristic in the main scanning direction, but it is also necessary to properly correct the curvature of field in the subscanning direction. In addition, the magnification in the subscanning direction needs to be corrected so that it is constant at the height of the whole image in order that the pitches of scanning lines on a scan surface 8 which is scanned with the plurality of light beams are equal to each other at the height of the whole image.

As in the second embodiment, even in the third embodiment, the light beams which have exited from the light source means 1 are incident upon a polygon mirror 5 at an angle of 85 degrees from the optical axis of the scanning optical means 9. Therefore, the location of reflection of the light beams at a deflecting surface 5a of the polygon mirror 5 changes asymmetrically with respect to the optical axis of the scanning optical means 9. When the location of reflection changes asymmetrically, the location of the linear virtual image formed near the deflecting surface 5a of the polygon mirror 5 changes, so that not only is the image formation in the main scanning direction adversely affected, but the image formation in the subscanning direction is also adversely affected. In other words, even in the subscanning direction, the curvature of field becomes asymmetrical, and the magnification in the subscanning direction is not constant, so that there is tilting.

To overcome these problems, as in the second embodiment, in the third embodiment, surfaces 7a and 7b of a second fθ lens 7 are formed as generating-line asymmetrical surfaces, that is, a generating-line asymmetrical tilted surface and a generating-line asymmetrical curvature surface in order to properly correct the curvature of field and the fθ characteristic in the main scanning direction, and changes in the magnification and the curvature of field in the subscanning direction.

Although the lens surfaces 7a and 7b of the second fθ lens 7 are formed as generating-line asymmetrical surfaces, that is, a generating-line asymmetrical tilted surface and generating-line asymmetrical curvature surface, they may be formed as either one of the two types of asymmetrical surfaces.

In the third embodiment, when the distance from the deflecting surface 5a of the polygon mirror 5 to the natural focusing point due to the condenser lens 42 is L, and the fθ coefficient of the scanning optical means 9 is k, each of the component parts are formed so as to satisfy the following condition:

$$|L| \geq 3 \times k$$

This makes it possible to make the whole optical scanner more compact. The natural focusing point refers to the location where light beams incident upon the polygon mirror are gathered and concentrated.

Figure 15:
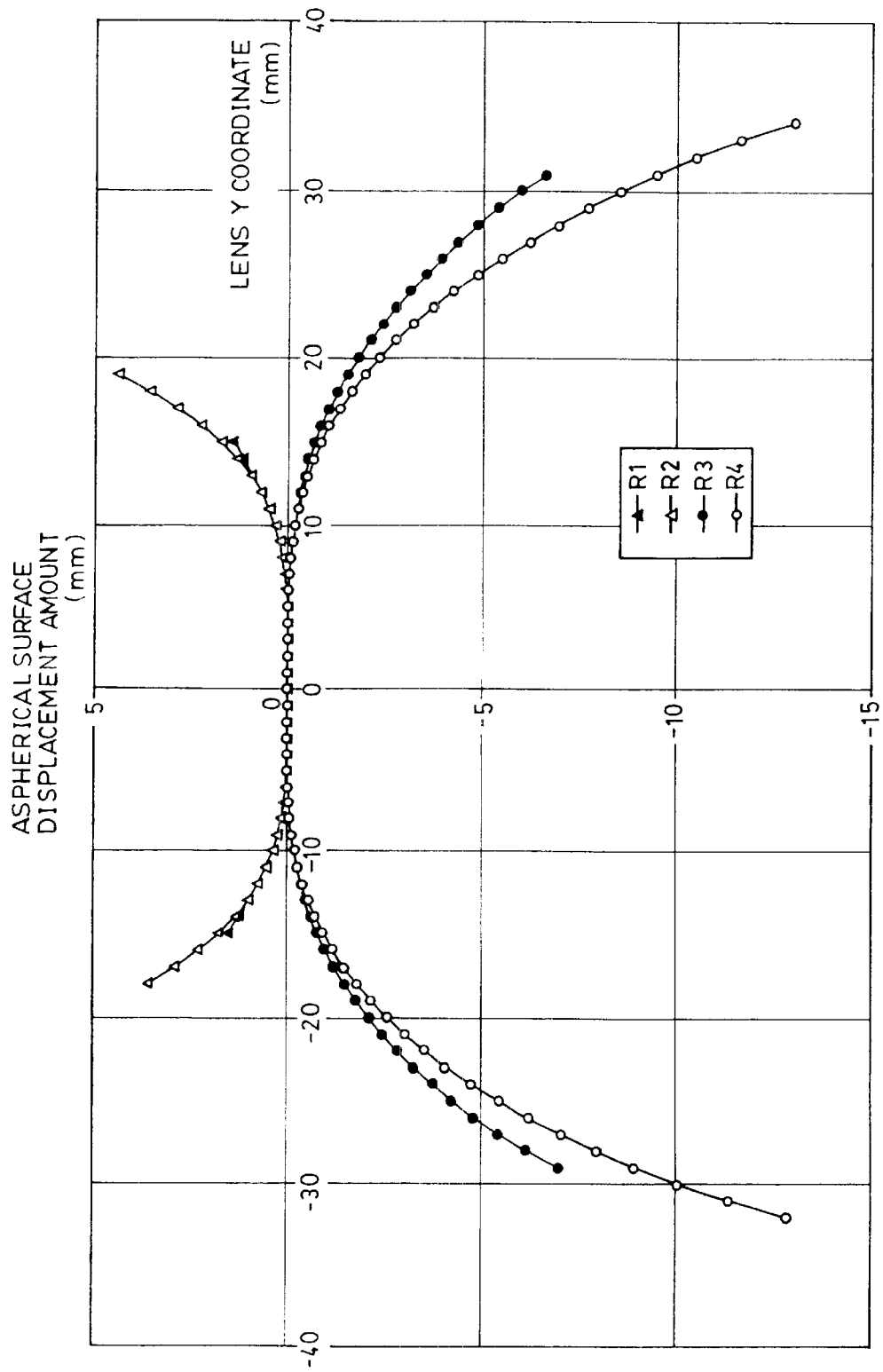
FIG. 15 is a graph showing the amount of displacement of each aspherical surface of each fθ lens used in the third embodiment of the present invention.
Figure 16:
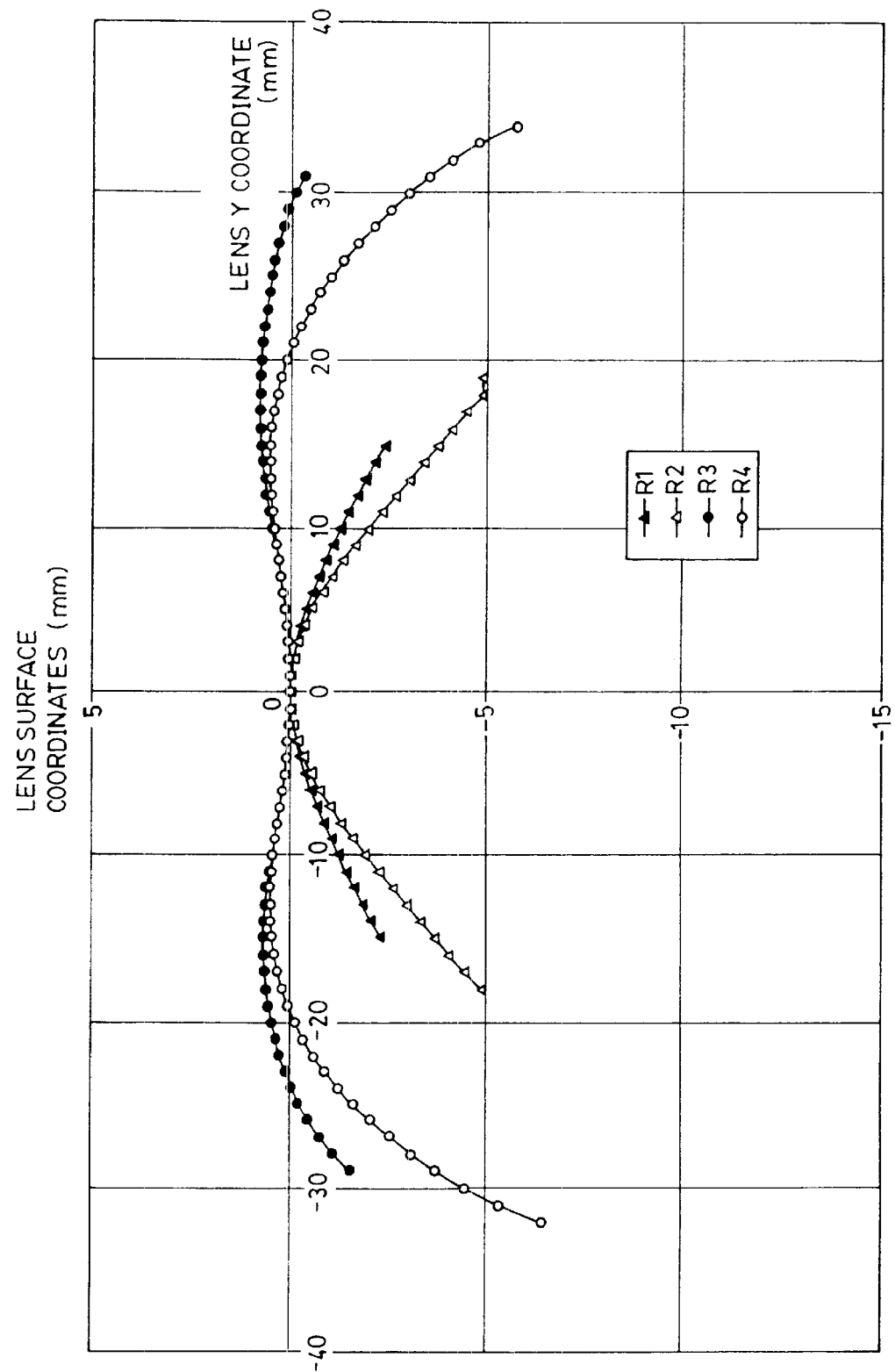
FIG. 16 is a graph showing the coordinates of each surface of each fθ lens used in the third embodiment of the present invention.
Figure 17:
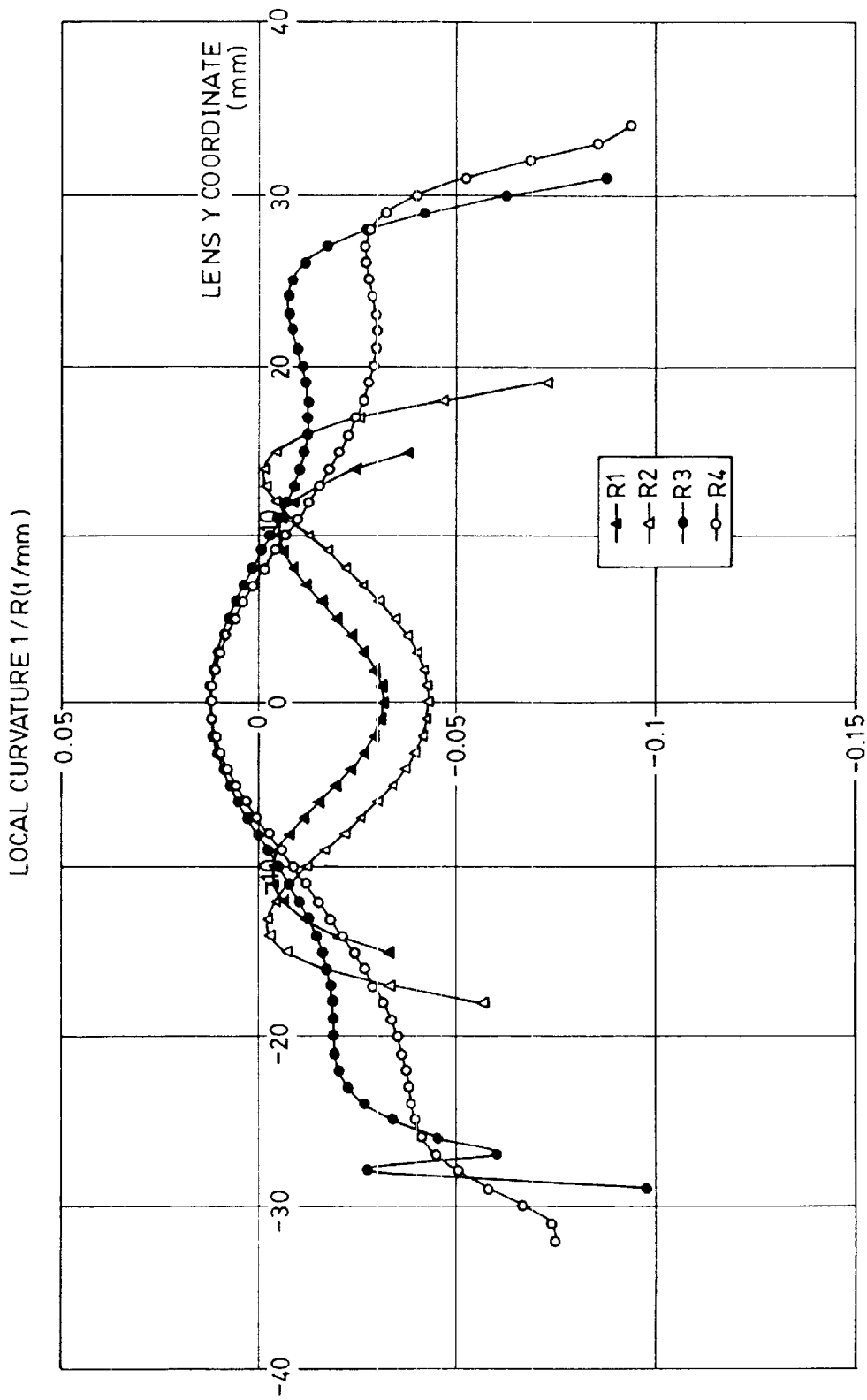
FIG. 17 is a graph showing the curvature of each surface of the fθ lens used in the third embodiment of the present invention.

Table 3 gives various coefficients used to represent the generating-line shapes of the first and second fθ lenses 6 and 7, and various other characteristics thereof. FIG. 15 is a graph showing the amount of displacement of each of the aspherical surfaces 6a and 6b of the first fθ lens 6 and each of the aspherical surfaces 7a and 7b of the second fθ lens 7. FIG. 16 is a graph showing the coordinates of each of the surfaces 6a and 6b of the first fθ lens 6 and each of the surfaces 7a and 7b of the second fθ lens 7. FIG. 17 is a graph showing the curvature of each of the surfaces 6a and 6b of the first fθ lens 6 and each of the surfaces 7a and 7b of the second fθ lens 7. The displacements, the coordinates, and the curvatures are substantially the same as those of the first embodiment, so that similar advantages are provided.

TABLE 3

STRUCTURE OF LIGHT SCANNER

| fθ COEFFICIENT | | | GENERATING-LINE SHAPE OF fθ LENS 6 | | | GENERATING-LINE SHAPE OF fθ LENS 7 | |
|---|---|---|---|---|---|---|---|
| | | | FIRST SURFACE LIGHT SOURCE SIDE | SECOND SURFACE LIGHT SOURCE SIDE | | FIRST SURFACE LIGHT SOURCE SIDE | SECOND SURFACE LIGHT SOURCE SIDE |
| fθ COEFFICIENT | k | 109 | | | | | |
| WAVELENGTH, REFRACTIVE INDEX | | | | | | | |
| WAVELENGTH IN USE | λ(nm) | 780 | R  −3.16583E+01 | −2.33543E+01 | R | 7.99457E+01 | 8.32977E+01 |
| REFRACTIVE INDEX OF fθ LENS 6 | N1 | 1.5242 | K  −2.17415E+00 | −1.24746E+00 | K | −6.67681E+00 | −1.28671E−01 |
| REFRACTIVE INDEX OF fθ LENS 7 | N2 | 1.5242 | B4  3.82086E−05 | 1.69379E−05 | B4 | −1.47326E−05 | −2.07684E−05 |
| ARRANGEMENT OF IMAGE-FORMING OPTICAL SYSTEM | | | B6  −8.12218E−08 | 3.69672E−08 | B6 | 1.34369E−08 | 2.36190E−08 |
| REFLECTING SURFACE 5a OF POLYGON MIRROR to LIGHT-INCIDENT SURFACE 6a OF LENS 6 | d1 | 11.03 | B8  0.00000E+00 | −1.09287E−10 | B8 | −1.52447E−12 | −2.68027E−11 |
| LIGHT-INCIDENT SURFACE 6a OF LENS 6 to LIGHT-EXITING SURFACE 6b OF LENS 6 | d2 | 7.19 | B10  0.00000E+00 | 0.00000E+00 | B10 | −2.97481E−15 | 2.16352E−14 |
| LIGHT-EXITING SURFACE 6b OF LENS 6 to LIGHT-INCIDENT SURFACE 7a OF LENS 7 | d3 | 5.80 | B12  0.00000E+00 | 0.00000E+00 | B12 | −1.60701E−20 | −7.73173E−18 |
| LIGHT-INCIDENT SURFACE 7a OF LENS 7 to LIGHT-EXITING SURFACE 7b OF LENS 7 | d4 | 7.83 | B14  0.00000E+00 | 0.00000E+00 | B14 | 0.00000E+00 | 0.00000E+00 |
| LIGHT-EXITING SURFACE 7b OF LENS 7 to SCAN SURFACE 8 | d5 | 101.00 | B16  0.00000E+00 | 0.00000E+00 | B16 | 0.00000E+00 | 0.00000E+00 |
| | | | SIDE AWAY FROM LIGHT SOURCE | SIDE AWAY FROM LIGHT SOURCE | | SIDE AWAY FROM LIGHT SOURCE | SIDE AWAY FROM LIGHT SOURCE |
| EFFECTIVE SCANNING WIDTH | W | 214 | R  −3.16583E+01 | −2.33546E+01 | R | 7.99457E+01 | 8.32977E+01 |
| k/W | k/W | 0.51 | K  −2.17415E+00 | −1.24746E+00 | K | −6.67681E+00 | −1.28671E−01 |
| | | | B4  3.87193E−05 | 1.77120E−05 | B4 | −1.66083E−05 | −2.27559E−05 |
| REFLECTING SURFACE 5a OF POLYGON MIRROR to LAST SURFACE 7b of LENS | d | 31.84 | B6  −7.78510E−08 | 3.74263E−08 | B6 | 1.27280E−08 | 2.59444E−08 |
| d/W | d/W | 0.15 | B8  0.00000E+00 | −1.19452E−10 | B8 | 2.35689E−12 | −3.16207E−11 |
| | | | B10  0.00000E+00 | 0.00000E+00 | B10 | −7.42549E−15 | 2.72317E−14 |
| REFLECTING SURFACE 5a OF POLYGON MIRROR to NATURAL FOCUSTING POINT | L | 960 | B12  0.00000E+00 | 0.00000E+00 | B12 | 1.90574E−19 | −1.09898E−17 |
| L/k | L/k | 8.81 | B14  0.00000E+00 | 0.00000E+00 | B14 | 0.00000E+00 | 0.00000E+00 |
| | | | B16  0.00000E+00 | 0.00000E+00 | B16 | 0.00000E+00 | 0.00000E+00 |

| fθ COEFFICIENT | | | LINE-PERPENDICULAR-TO-GENERATING-LINE SHAPE | |
|---|---|---|---|---|
| | | | fθ LENS 6 FIRST SURFACE | fθ LENS 7 FIRST SURFACE |
| fθ COEFFICIENT | k | 109 | | |
| WAVELENGTH, REFRACTIVE INDEX | | | | |
| WAVELENGTH IN USE | λ(nm) | 780 | Rs  −8.00000E+00 | 1.42331E+02 |
| REFRACTIVE INDEX OF fθ LENS 6 | N1 | 1.5242 | D2  2.89194E−03 | 1.01659E−02 |
| REFRACTIVE INDEX OF fθ LENS 7 | N2 | 1.5242 | D4  1.56775E−04 | −1.80251E−05 |
| ARRANGEMENT OF IMAGE-FORMING OPTICAL SYSTEM | | | D6  −1.02035E−06 | 1.41686E−08 |
| REFLECTING SURFACE 5a OF POLYGON MIRROR to LIGHT-INCIDENT SURFACE 6a OF LENS 6 | d1 | 11.03 | D8  1.56092E−09 | 1.21056E−11 |
| LIGHT-INCIDENT SURFACE 6a OF LENS 6 to LIGHT-EXITING | d2 | 7.19 | D10  0.00000E+00 | −1.76415E−14 |

TABLE 3-continued

STRUCTURE OF LIGHT SCANNER

SURFACE 6b OF LENS 6

|  |  |  |  | SECOND SURFACE | SECOND SURFACE |
|---|---|---|---|---|---|
| EFFECTIVE SCANNING WIDTH | W | 214 | Rs | −3.65212E+02 | −1.00483E+01 |
| k/W | k/W | 0.51 | D2 | −4.02874E−02 | 1.10009E−03 |
|  |  |  | D4 | 6.40129E−03 | −1.74534E−06 |
| REFLECTING SURFACE 5a OF POLYGON MIRROR to LAST SURFACE 7b of LENS | d | 31.84 | D6 | −9.39445E−05 | 1.63336E−09 |
| d/W | d/W | 0.15 | D8 | −4.02458E−06 | −7.01234E−13 |
|  |  |  | D10 | 1.11164E−07 | 8.91421E−17 |

In the third embodiment, the generating-line asymmetrical surfaces correspond to both surfaces 6a and 6b of the first fθ lens 6 and both surfaces 7a and 7b of the second fθ lens 7. The shape of each of the surfaces 6a, 6b, 7a, and 7b in a direction perpendicular to the corresponding generating line is symmetrical on both sides of the optical axis. In addition, its radius of curvature changes continuously as the coordinates of each of the lenses 6 and 7 change in the main scanning direction.

The radius of curvature Rs' in the direction of the line perpendicular to its corresponding generating line at the corresponding coordinate Y in the main scanning direction is given by Formula (5):

$$Rs'=Rs\times(1+D2\times Y^2+D4\times Y^4+D6\times Y^6+D8\times Y^8+D10\times Y^{10}) \quad (5)$$

where Rs is the radius of curvature on the optical axis, and D2, D4, D6, D8, and D10 are each coefficients.

Figure 18:
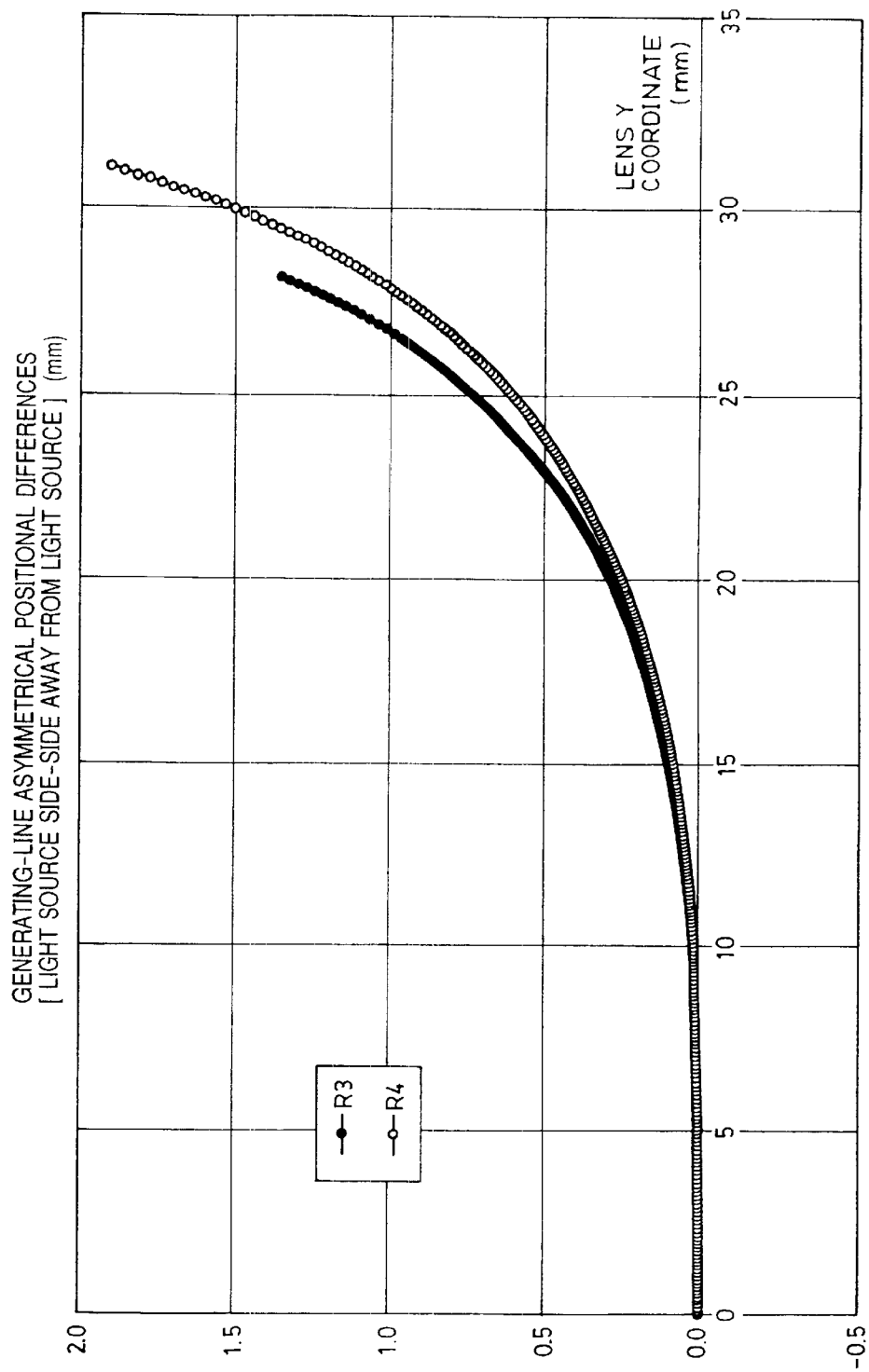
FIG. 18 is a graph showing the differences in position (that is, the asymmetry) of generating-line asymmetric surfaces in the third embodiment of the present invention.
Figure 19:
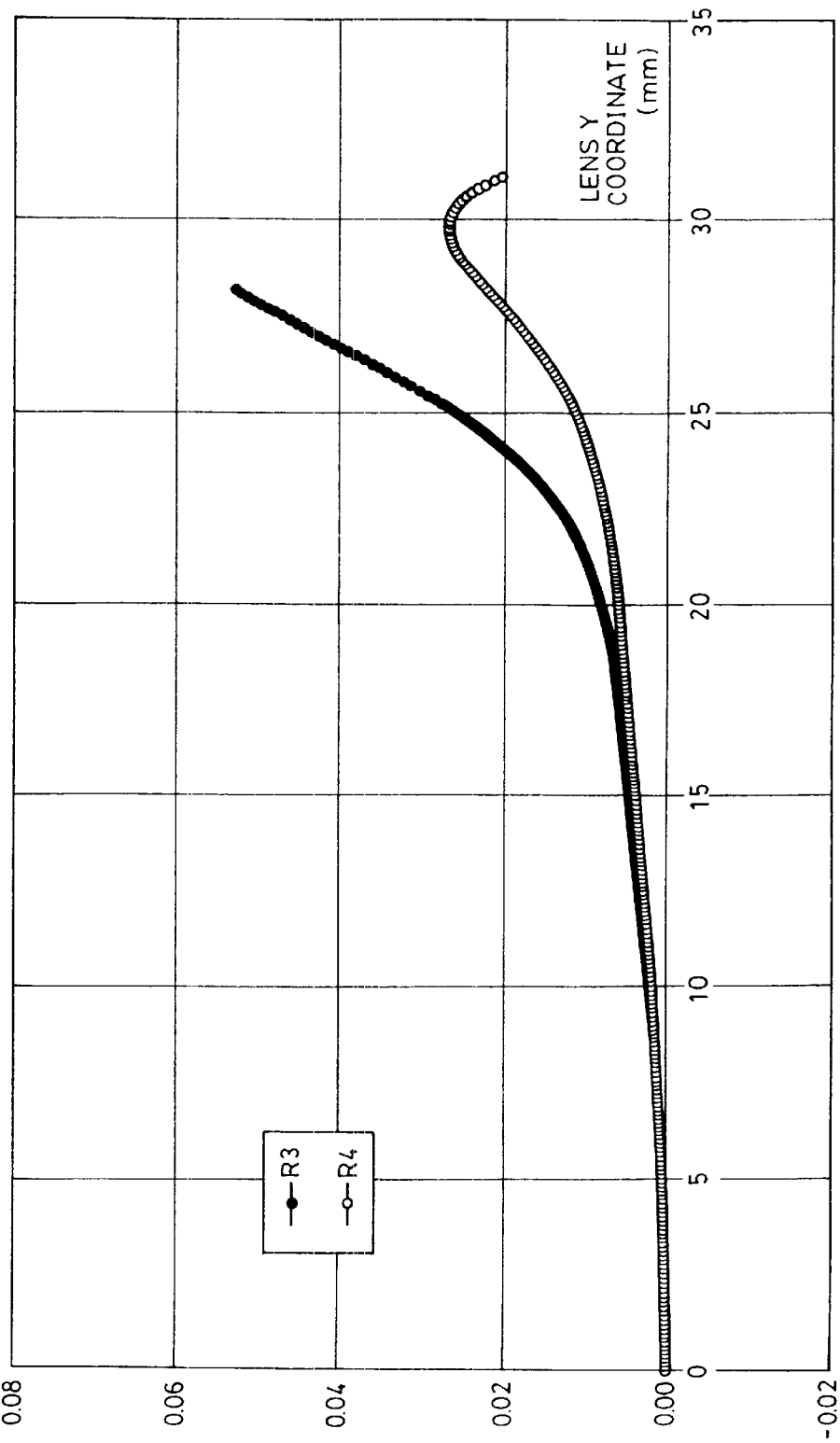
FIG. 19 is a graph showing the differences in curvature (1/R) (that is, the asymmetry) of the generating-line asymmetric surfaces in the third embodiment of the present invention.

FIGS. 18 and 19 are graphs showing the asymmetry of the generating-line shape of each of the surfaces 7a and 7b of the second fθ lens 7 used in the third embodiment.

Similarly to FIG. 11, FIG. 18 shows the positional differences in the optical axis direction between the light source means side of each of the surfaces 7a and 7b (the top half) and the side of each of the surfaces 7a and 7b away from the light source means (the bottom half), at equal distances from the optical axis in the main scanning direction (that is, at corresponding Y coordinates). FIG. 19 shows the differences in curvature (1/R) between the light source means side of each of the surfaces 7a and 7b and the side of each of the surfaces 7a and 7b away from the light source means (that is, both top and bottom sides), at equal distances from the optical axis in the main scanning direction (that is, at corresponding Y coordinates). The positional differences and the differences in curvature are substantially the same as those of the second embodiment, so that similar advantages are provided.

Figure 20:
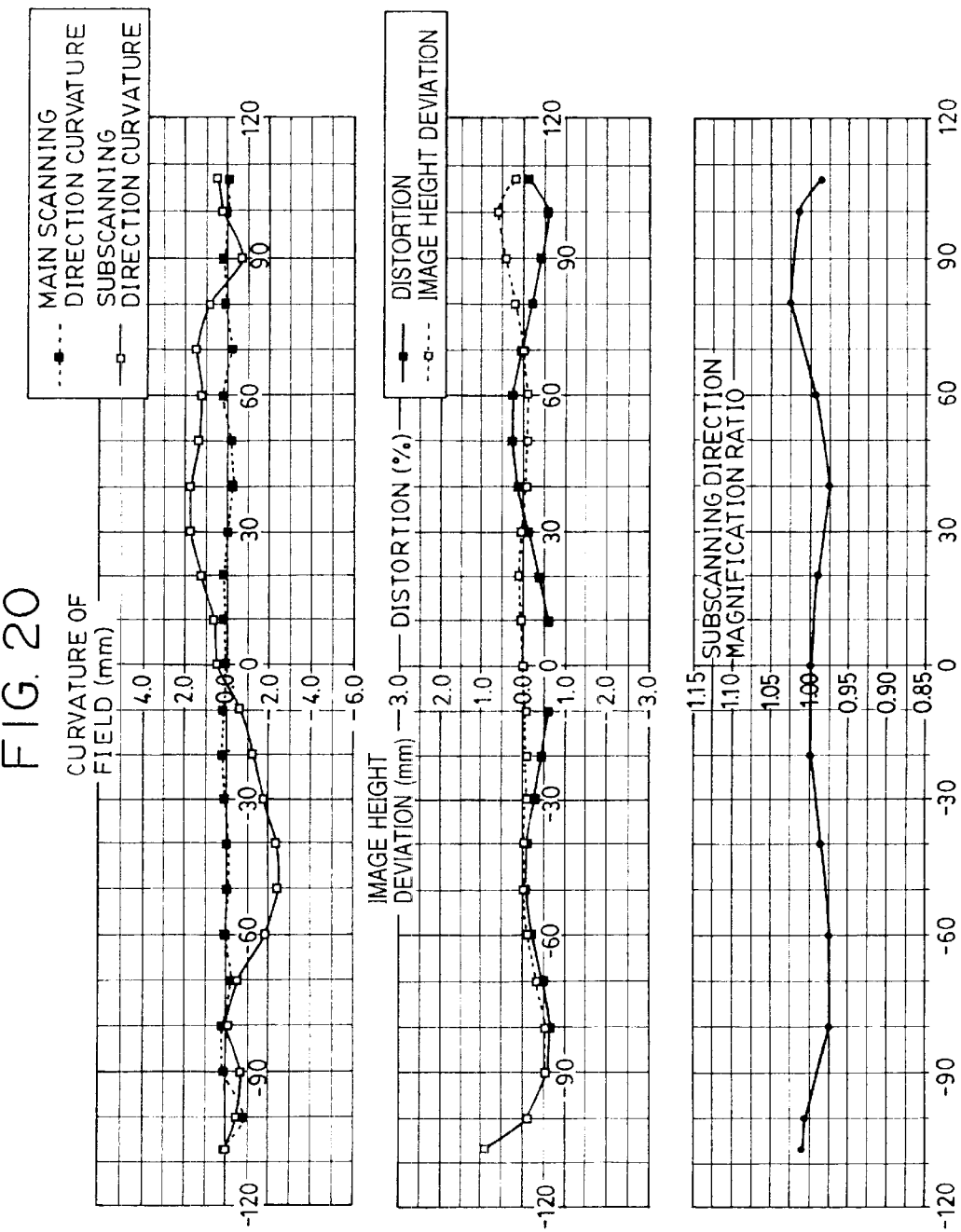
FIG. 20 shows graphs illustrating the curvature of field and the distortion in the main scanning direction, and the curvature of field, and the magnification ratio in the subscanning direction.

FIG. 20 shows graphs showing magnification ratio, the distortion (the fθ characteristic), and the curvature of field in the main scanning direction and the subscanning direction. From FIG. 20, it can be seen that each of these aberrations is corrected by an amount where no practical problems arise.

Although in the third embodiment a multiple-beam light scanner is used, a single-beam light scanner having a single light-emitting section may also be used.

Although in the third embodiment the plurality of light beams which have exited from the light source means are converted into weakly focused light beams by the condenser lens, they may also be converted into substantially parallel light beams.

Figure 21:
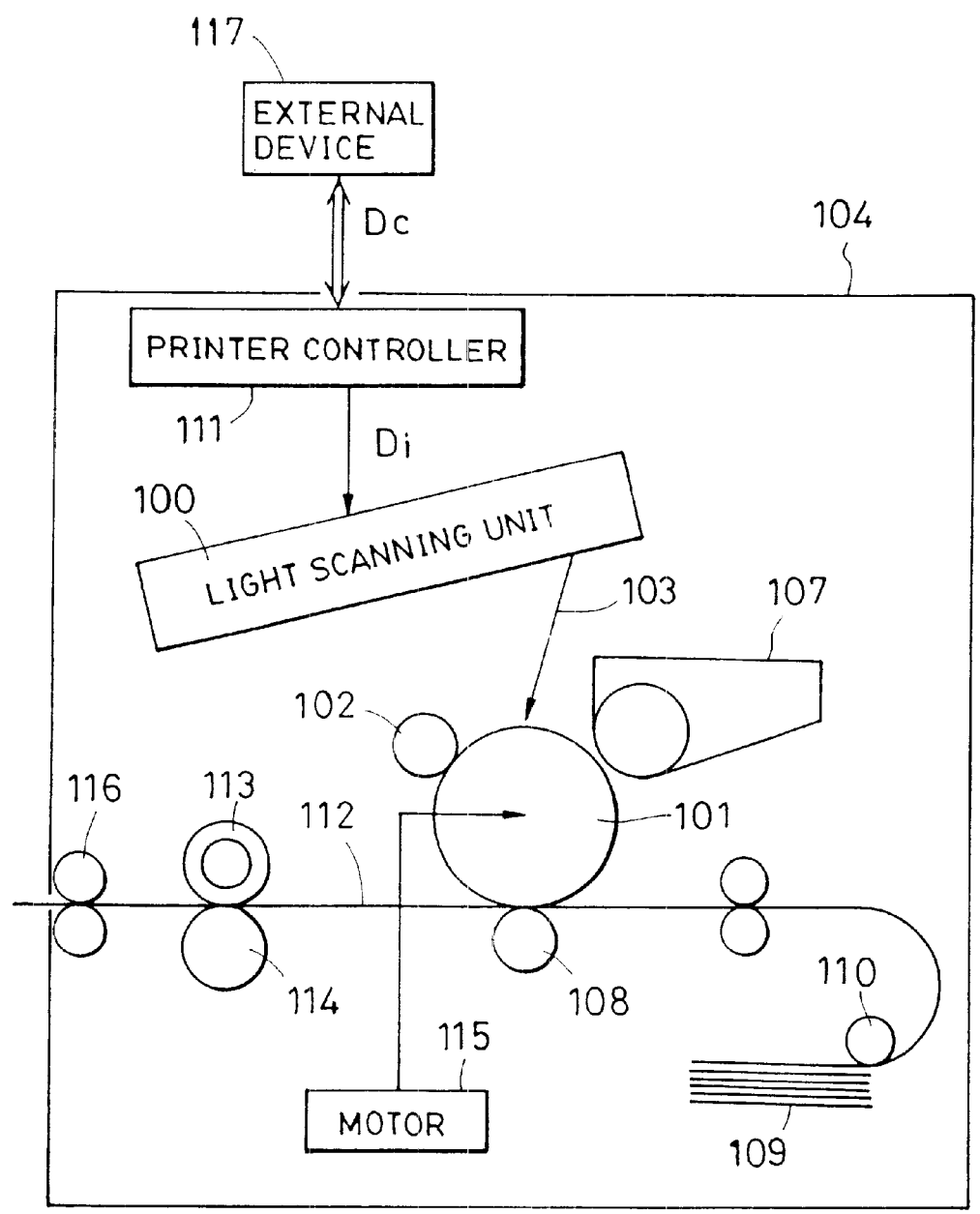
FIG. 21 is a sectional view of an example of the structure of an electrophotographic printer using a light scanning optical system of the present invention in a subscanning direction.
Figure 22:
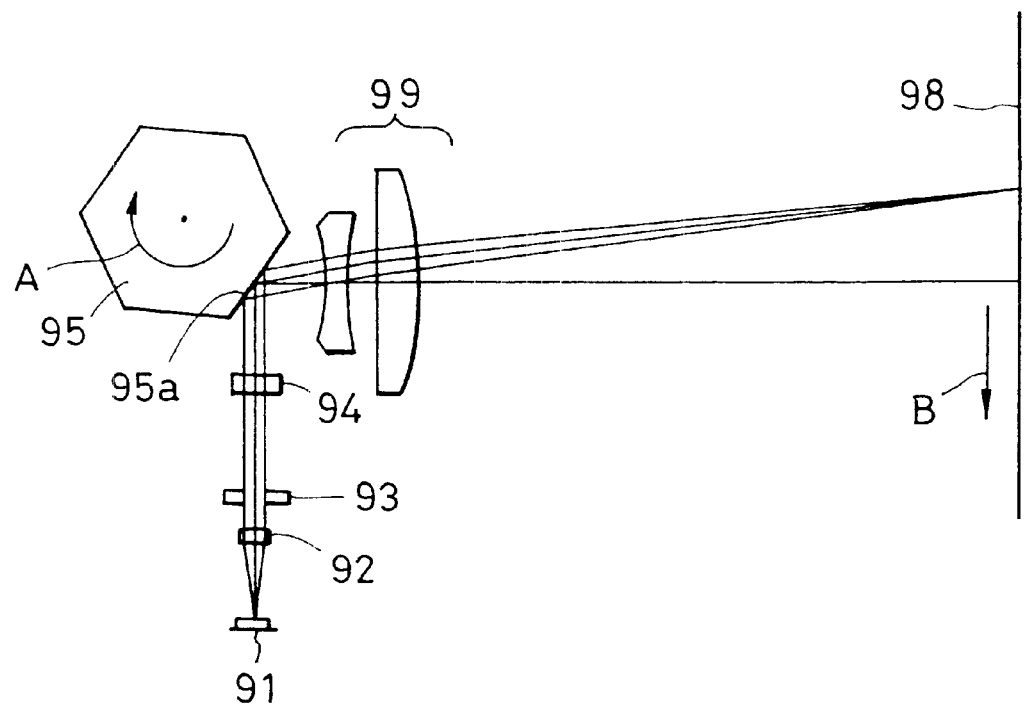
FIG. 22 is a sectional view of the main portion of an optical system of a conventional optical scanner in a main scanning direction thereof.

FIG. 21 is a sectional view of an embodiment of an image forming apparatus of the present invention in the subscanning direction. In FIG. 21, reference numeral 104 denotes an image forming apparatus. Code data Dc is input to the image forming apparatus 104 from an external device 117, such as a personal computer. The code data Dc is converted into image data (that is, dot data) Di by a printer controller 111 disposed inside the image forming apparatus 104. The image data Di is input to a light scanning unit 100 having any one of the structures of the first to third embodiments. A light beam 103 which has been modulated in accordance with the image data Di exits from the light scanning unit 100. The light beam 103 scans a photosensitive surface of a photosensitive drum 101 in the main scanning direction.

The photosensitive drum 101 which is an electrostatic latent image carrier (a photosensitive member) is rotated clockwise by a motor 115. As the photosensitive drum 101 rotates, the photosensitive surface of the photosensitive drum 101 moves with respect to the light beam 103 in the main scanning direction and the subscanning direction which is perpendicular to the main scanning direction. A charging roller 102 which uniformly charges the surface of the photosensitive drum 101 is provided above the photosensitive drum 101 so that it contacts therewith. The light beam 103 irradiates the surface of the photosensitive drum 101 charged by the charging roller 102 in order to scan it by the light scanning unit 100.

As discussed above, the light beam 103 is modulated based on the image data Di, and, by irradiating the surface of the photosensitive drum 101 with the light beam 103, an electrostatic latent image is formed thereon. The electrostatic latent image is developed as a toner image by a developing device 107 which is disposed so as to contact the photosensitive drum 101 at a location downstream from the location of irradiation using the light beam 103.

The toner image which has been formed by developing the electrostatic latent image by the developing device 107 is transferred onto a sheet 112 used as a transfer material by a transfer roller 108 disposed below the photosensitive drum 101 so as to oppose it. Although the sheet 112 is shown contained in a sheet cassette 109 disposed in front of the photosensitive drum 101 (that is, at the right side of the photosensitive drum 101 in FIG. 21), it may be fed manually. A sheet feed roller 110 is disposed at an end of the sheet cassette 109, and is used to send the sheet 112 which is contained in the sheet cassette 109 into a transportation path.

In this way, the sheet 112 having the toner image transferred but not fixed thereon is transported to a fixing device which is disposed behind the photosensitive drum 101 (that is, at the left side of the photosensitive drum 101 in FIG. 21). The fixing device comprises a fixing roller 113 and a presser roller 114. The fixing roller 113 has a fixing heater (not shown) disposed therein. The presser roller 114 is disposed so as to press-contact the fixing roller 113. The sheet 112 which has been transported from the transfer section is heated by pressing it at a press-contacting section formed by the fixing roller 113 and the presser roller 114 in order to fix the toner image. A sheet-discharge roller 116 is disposed behind the fixing roller 112 in order to discharge the sheet 112 with the toner image fixed thereon out of the image forming apparatus 104.

Although not illustrated in FIG. 21, the print controller 111 not only converts the code data Dc but also controls each part, such as the motor 115 disposed inside the image-forming apparatus 104, and a polygon motor and the like disposed inside the light scanning unit 100.

Although in the first to third embodiments, each scanning optical means 9 comprises two lenses (the corresponding first and second fθ lenses 6 and 7), the number of lenses which make up each scanning optical means 9 is not limited to two lenses. Each scanning optical means 9 may comprise three or more optical elements (such as lenses and/or mirrors). For example, each scanning optical means 9 may be made up of at least a first fθ lens, a second fθ lens, and a third lens or mirror. It is preferable to use, for example, a cylindrical lens having refractive power only in the subscanning direction for each of the third lenses. It is preferable to use, for example, a cylindrical mirror having refractive power only in the subscanning direction for each of the third mirrors.

According to the present invention, when forming an image on the scan surface by the scanning optical means having a plurality of fθ lenses through the deflecting means using the light beams which have exited from the light source means, it is possible to properly correct the curvature of field and distortion in the main scanning direction and changes in the magnification and the curvature of field in the subscanning direction as a result of forming the plurality of fθ lenses with proper shapes. This makes it possible to provide a light scanner which has a compact structure and which is suitable for high-definition printing, and an image-forming apparatus using the same.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A light scanner comprising:
    light-incident optical means for guiding light which has exited from a light source to a deflecting unit; and
    scanning optical means for forming an image on a scan surface using light deflected by the deflecting unit,
    wherein said scanning optical means includes a plurality of lenses, with at least one lens of said plurality of lenses having at least one aspherical surface whose shape changes asymmetrically from the optical axis of said at least one lens to either end of said at least one lens,
    wherein said light-incident optical means causes the light which has exited from the light source to be incident upon a deflecting surface of the deflecting unit obliquely from the optical axis of said at least one lens, the optical axis being within a main scanning cross-sectional plane, and
    wherein the at least one aspherical surface of said at least one lens is a tilted generating-line asymmetrical surface, in which an end of a surface nearer the light source is closer to the scan surface than an end of a surface disposed farther from the light source, with respect to the optical axis of said at least one lens.

2. A light scanner according to claim 1, wherein the tilted generating-line asymmetrical surface is formed on said at least one lens that is disposed closest to the scan surface.

3. A light scanner according to claim 1, wherein the light scanner is a multiple-beam light scanner, and
    wherein the tilted generating-line asymmetrical surface is formed on both surfaces of said at least one lens.

4. A light scanner according to claim 1, wherein the at least one aspherical surface of said at least one lens is a generating-line asymmetrical curvature surface such that the at least one aspherical surface has at an end nearer to the light source a curvature greater than a curvature at an end of the surface disposed farther from the light source, with respect to the optical axis of said at least one lens.

5. A light scanner according to claim 4, wherein the generating-line asymmetrical curvature surface is formed on said at least one lens that is disposed closest to the scan surface.

6. A light scanner according to claim 4, wherein the generating-line asymmetrical curvature surface is formed on both surfaces of said at least one lens.

7. A light scanner according to claim 1, wherein said scanning optical means includes a first lens and a second lens, and
    wherein, when the refractive powers of said first lens and said second lens within the main scanning cross-sectional plane are $\Phi 1$ and $\Phi 2$, respectively, the following condition is satisfied:

$$\Phi 2 \leq \Phi 1/5.$$

8. A light scanner according claim 1, wherein said scanning optical means includes a first lens and a second lens, and a principal plane of said second lens is disposed closer to the deflecting unit than a principal plane of said first lens.

9. A light scanner according to claim 1, wherein, when a distance from the deflecting surface of the deflecting unit to a surface of at least one lens facing the scan surface is d, and the effective scanning width on the scan surface is W, the following condition is satisfied:

$$d/W \leq 0.2.$$

10. A light scanner according to claim 1, wherein a side closer to the light source of an effective portion of each of said plurality of lenses is longer than a side of the effective portion of each of said plurality of lenses disposed farther from the light source, with respect to an optical axis of each of said plurality of lenses.

11. A light scanner according to claim 1, wherein, when an fθ coefficient of said scanning optical means is k, and an effective scanning width on the scan surface is W, the following condition is satisfied:

$$k/W \leq 0.6.$$

12. A light scanner according to claim 1, wherein said light-incident optical means includes a condenser lens for converting the light, which has exited the light source, into one of a plurality of substantially parallel light beams and weakly focused light beams, and
    wherein, when a distance from the deflecting surface of the deflecting unit to a point where the light beams are naturally focused by the condenser lens is L, and an fθ coefficient of said scanning optical means is k, the following condition is satisfied:

$|L| \geq 3 \times k.$

13. A light scanner according to claim 1, wherein the light source includes a plurality of light-emitting sections.

14. An image forming apparatus comprising:
the light scanner according to any one of claims 1 to 13, and
a printer controller for converting code data input from an external device into an image signal, and inputting the image signal to the light scanner.

15. A light scanner comprising:
light-incident optical means for guiding light which has exited from a light source to a deflecting unit; and
scanning optical means for forming an image on a scan surface using light deflected by the deflecting unit,
wherein said scanning optical means includes a plurality of lenses, with at least one lens of said plurality of lenses having at least one aspherical surface whose shape changes asymmetrically from an optical axis of said at least one lens to either end of said at least one lens,
wherein said light-incident optical means causes the light which has exited from the light source to be incident upon a deflecting surface of the deflecting unit obliquely from the optical axis of said at least one lens of said plurality of lenses, the optical axis being within a main scanning cross-sectional plane, and
wherein the at least one aspherical surface of said at least one lens has a generating-line asymmetrical curvature, in which an end of a surface nearer the light source has a curvature greater than an end of a surface disposed farther from the light source, with respect to the optical axis of said at least one lens.

16. A light scanner according to claim 15, wherein the generating-line asymmetrical curvature is formed on said at least one lens that is disposed closest to the scan surface.

17. A light scanner according to claim 15, wherein the generating-line asymmetrical curvature is formed on both surfaces of said at least one lens.

18. A light scanner according to claim 15, wherein the scanning optical means includes a first lens and a second lens, and
wherein, when refractive powers of said first lens and said second lens within the main scanning cross-sectional plane are $\Phi 1$ and $\Phi 2$, respectively, the following condition is satisfied:

$\Phi 2 \leq \Phi 1/5.$

19. A light scanner according to claim 15, wherein said scanning optical means includes a first lens and a second lens, and a principal plane of said second lens is disposed closer to the deflecting unit than a principal plane of said first lens.

20. A light scanner according to claim 15, wherein, when a distance from the deflecting surface of the deflecting unit to a surface of at least one lens facing the scan surface is d, and an effective scanning width on the scan surface is W, the following condition is satisfied:

$d/W \leq 0.2.$

21. A light scanner according to claim 15, wherein a side closer to the light source of an effective portion of each of said plurality of lenses is longer than a side of the effective portion of each of said plurality of lenses disposed away from the light source, with respect to the optical axis of each of said plurality of lenses.

22. A light scanner according to claim 15, wherein, when an fθ coefficient of said scanning optical means is k, and an effective scanning width on the scan surface is W, the following condition is satisfied:

$k/W \leq 0.6.$

23. A light scanner according to claim 15, wherein the light-incident optical means includes a condenser lens for converting the light, which exited the light source, into one of a plurality of substantially parallel light beams and weakly focused light beams, and
wherein, when the distance from the deflecting surface of the deflecting unit to a point where the light beams are naturally focused by the condenser lens is L and an fθ coefficient of said scanning optical means is k, the following condition is satisfied:

$|L| \geq 3 \times k.$

24. A light scanner according to claim 15, wherein the light source includes a plurality of light-emitting sections.

25. An image forming apparatus comprising:
the light scanner according to any one of claims 15 to 24; and
a printer controller for converting code data input from an external device into an image signal, and inputting the image signal to the light scanner.

* * * * *

UNITED STATES PATENT AND TRADEMARK OFFICE
CERTIFICATE OF CORRECTION

PATENT NO. : 6,690,497 B2  
DATED : February 10, 2004  
INVENTOR(S) : Keiichiro Ishihara It is certified that error appears in the above-identified patent and that said Letters Patent is hereby corrected as shown below:

Title page,  
Item [57], ABSTRACT,  
Line 4, "an" should read -- and --.

Column 5,  
Line 51, "the" ($2^{nd}$ occurrence) should be deleted.

Column 8,  
Line 64, "light-which" should read -- light which --.

Column 24,  
Line 31, "Φ2,respectively," should read -- Φ2, respectively, --.

Signed and Sealed this

First Day of June, 2004

JON W. DUDAS  
*Acting Director of the United States Patent and Trademark Office*